(12) United States Patent
Zimmermann

(10) Patent No.: US 10,156,775 B2
(45) Date of Patent: Dec. 18, 2018

(54) EXTENSIBLE MOBILE RECORDING DEVICE HOLDER

(71) Applicant: Eric Zimmermann, Woodside, NY (US)

(72) Inventor: Eric Zimmermann, Woodside, NY (US)

(*) Notice: Subject to any disclaimer, the term of this patent is extended or adjusted under 35 U.S.C. 154(b) by 0 days.

(21) Appl. No.: 15/610,887

(22) Filed: Jun. 1, 2017

(65) Prior Publication Data
US 2017/0363935 A1 Dec. 21, 2017

Related U.S. Application Data

(60) Provisional application No. 62/344,239, filed on Jun. 1, 2016.

(51) Int. Cl.
| | |
|---|---|
| *G03B 17/00* | (2006.01) |
| *G03B 17/56* | (2006.01) |
| *F16M 13/04* | (2006.01) |
| *H04N 5/225* | (2006.01) |
| *F16M 13/00* | (2006.01) |

(52) U.S. Cl.
CPC .......... *G03B 17/561* (2013.01); *F16M 13/04* (2013.01); *H04N 5/2252* (2013.01); *F16M 13/00* (2013.01); *G03B 17/00* (2013.01); *G03B 17/56* (2013.01)

(58) Field of Classification Search
CPC ...................................................... F16M 13/04
USPC ........................................................ 396/420
See application file for complete search history.

(56) References Cited

U.S. PATENT DOCUMENTS

| | | | | |
|---|---|---|---|---|
| 7,204,650 B2* | 4/2007 | Ghanouni | ............. | G03B 17/00 396/420 |
| 7,563,038 B2* | 7/2009 | Hershenzon | ........... | F16M 13/04 396/419 |
| 7,706,673 B1* | 4/2010 | Staudinger | ......... | F16M 11/2021 348/211.2 |
| 9,473,608 B1* | 10/2016 | Sherman | ................. | H04M 1/21 |
| 2006/0257137 A1* | 11/2006 | Fromm | .................. | F16M 11/18 396/420 |
| 2006/0257138 A1* | 11/2006 | Fromm | .................. | F16M 13/04 396/420 |
| 2007/0053680 A1* | 3/2007 | Fromm | .................. | F16M 11/14 396/420 |
| 2008/0205875 A1* | 8/2008 | Barabe | .................... | G02B 23/24 396/420 |
| 2011/0031287 A1* | 2/2011 | Le Gette | ................. | F16M 11/04 224/101 |
| 2016/0070155 A1* | 3/2016 | Alster | .................. | G03B 17/561 396/420 |

(Continued)

*Primary Examiner* — Clayton E LaBalle
*Assistant Examiner* — Kevin Butler

(57) ABSTRACT

There is disclosed a substantially integrated, concealed, and discreet device for extending and holding a mobile recording device. A user of this holder device can unlock the mechanism, pull an extension arm segment which will pull past the body of the recording device so as to form a handle and extension and thereby allow the user to capture audio, video, and other images at a distance greater than if holding the mobile recording device directly in his or her hand. Thus an extensible mobile recording device holder is provided that allows for a compact and concealable mechanism and efficient deployment so that users can quickly and adequately capture images from more varied and greater perspectives.

27 Claims, 24 Drawing Sheets

(56) References Cited

U.S. PATENT DOCUMENTS

| | | | |
|---|---|---|---|
| 2016/0070156 A1* | 3/2016 | Alster | G03B 17/563 |
| | | | 396/424 |
| 2016/0334638 A1* | 11/2016 | Wagner | G02B 27/646 |
| 2017/0108167 A1* | 4/2017 | Fan | F16M 13/04 |
| 2017/0159875 A1* | 6/2017 | Wagner | F16M 11/121 |
| 2017/0277021 A1* | 9/2017 | Sultan | G03B 17/561 |
| 2017/0307996 A1* | 10/2017 | Sato | G03G 15/0233 |

\* cited by examiner

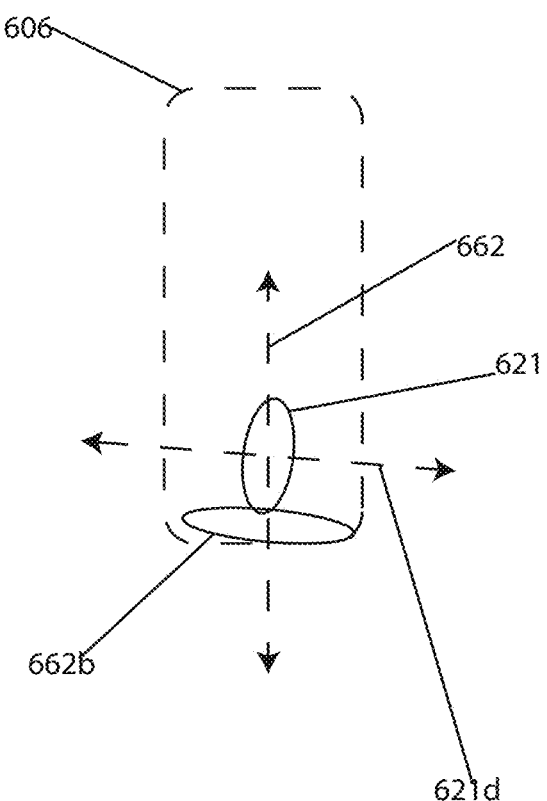

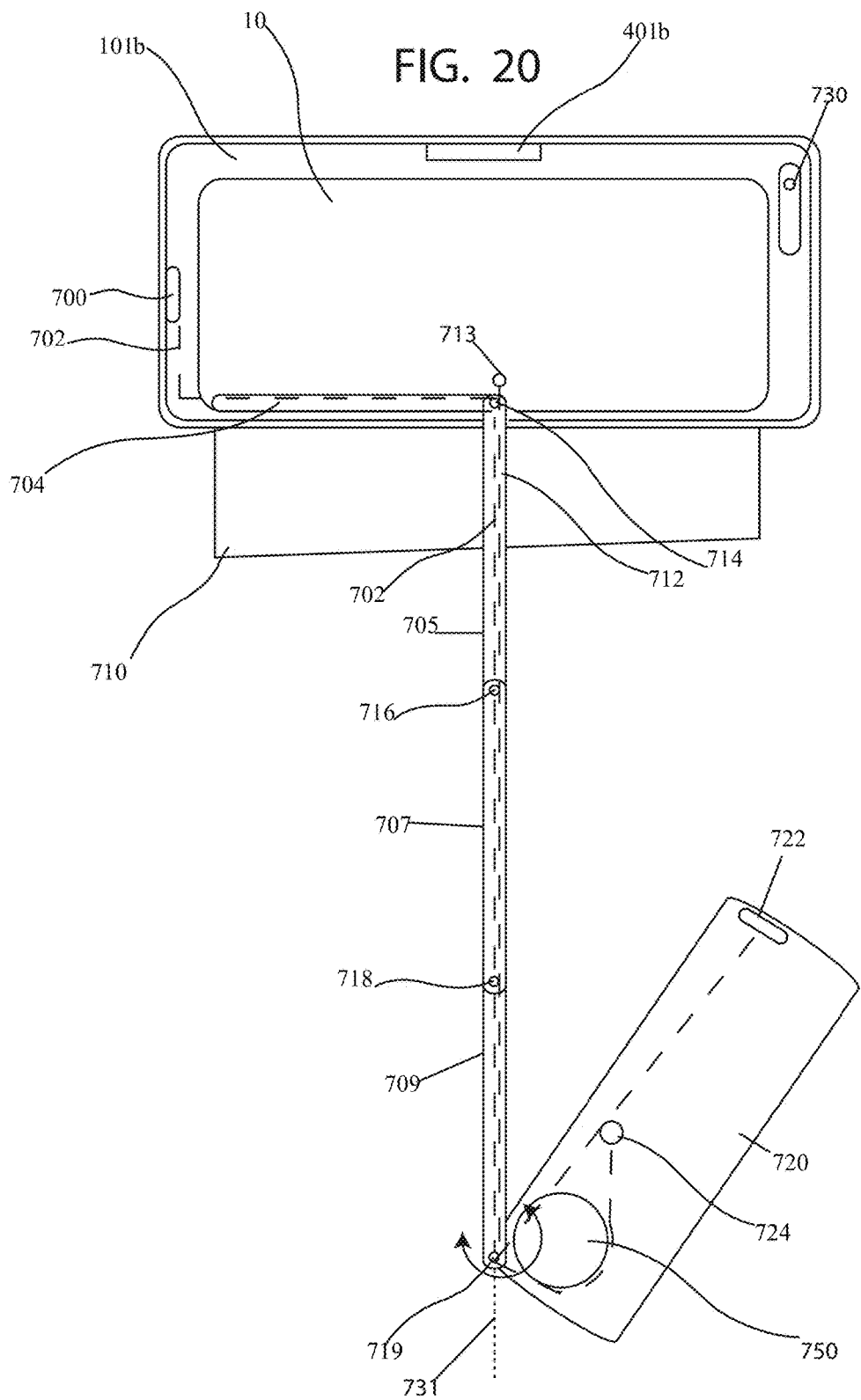

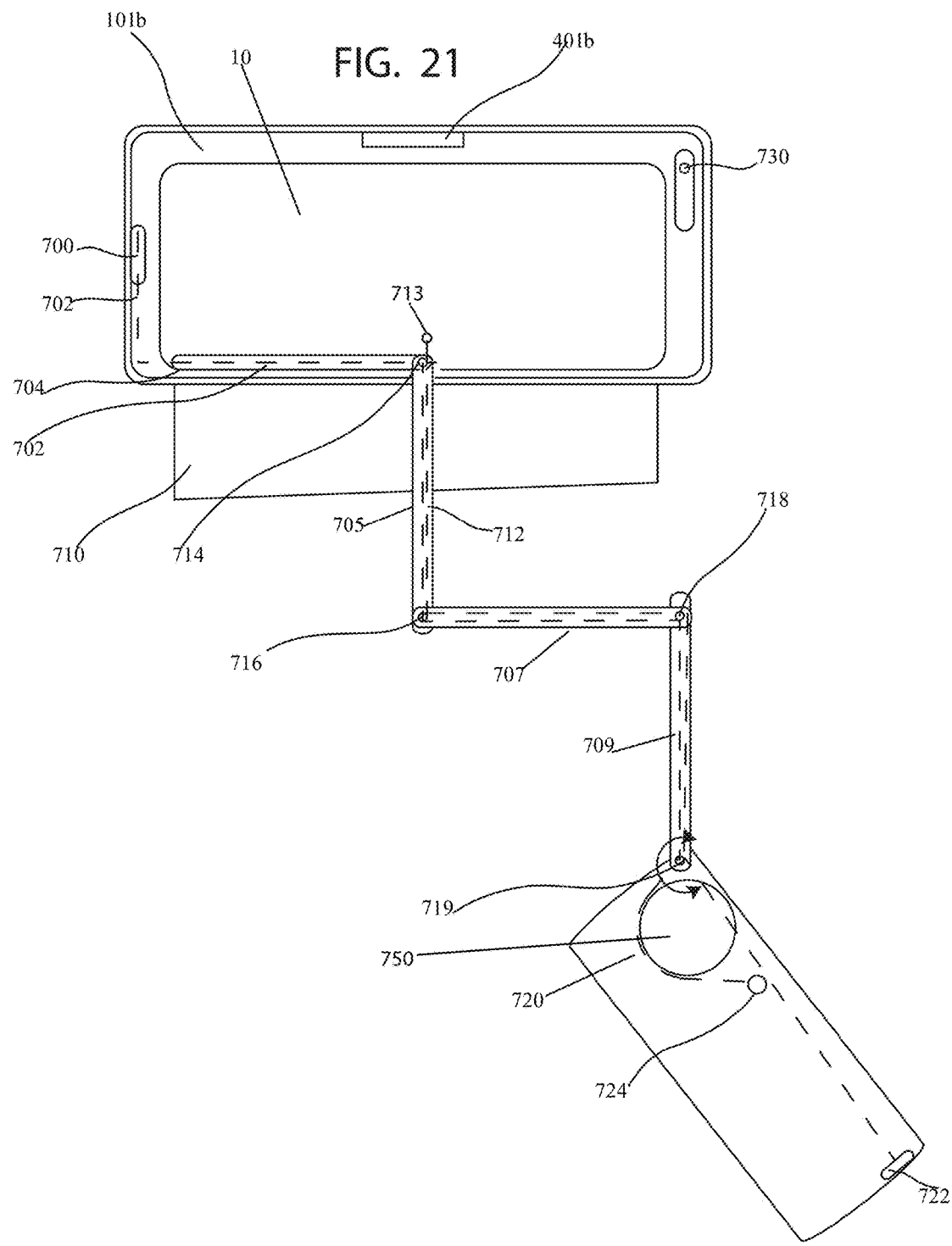

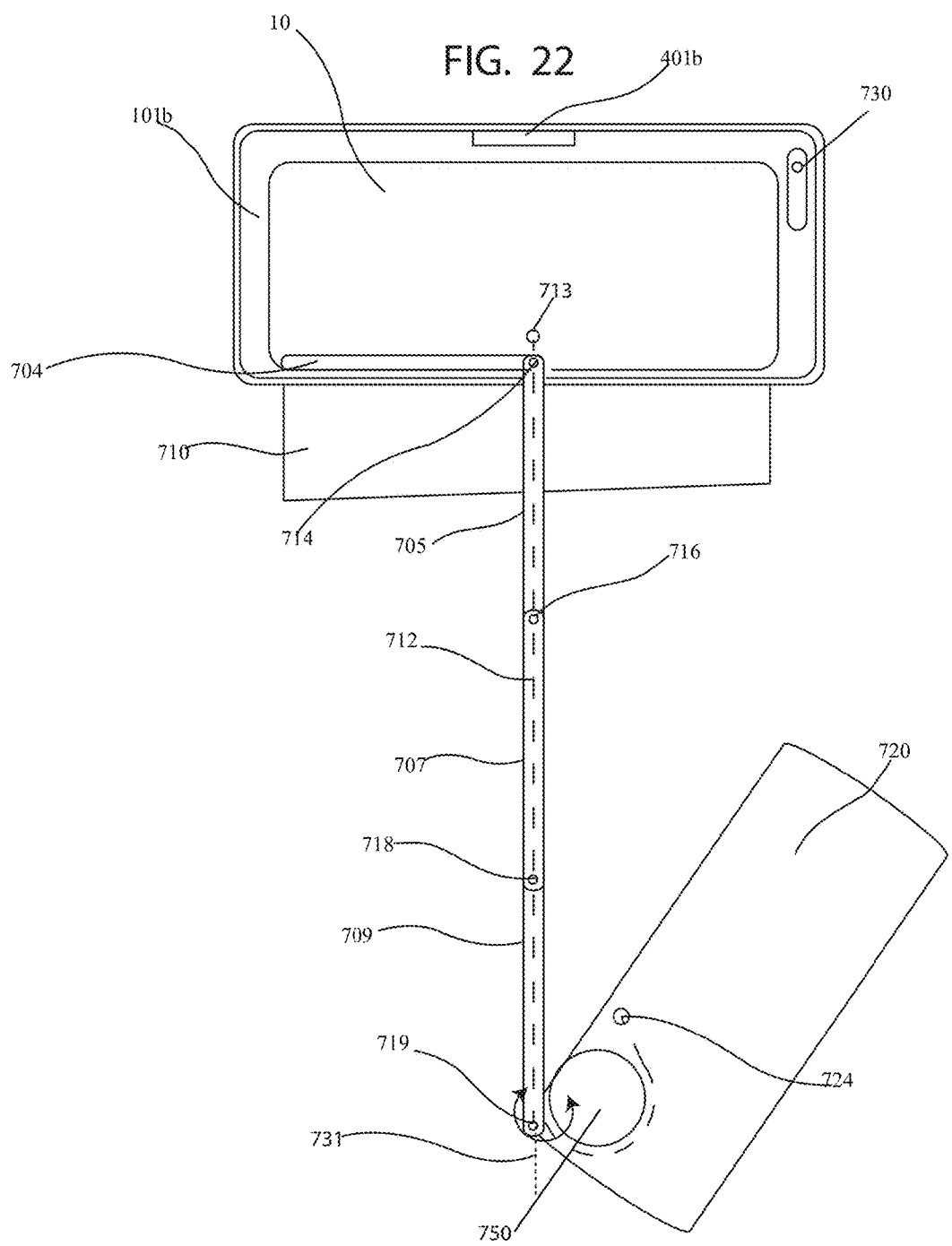

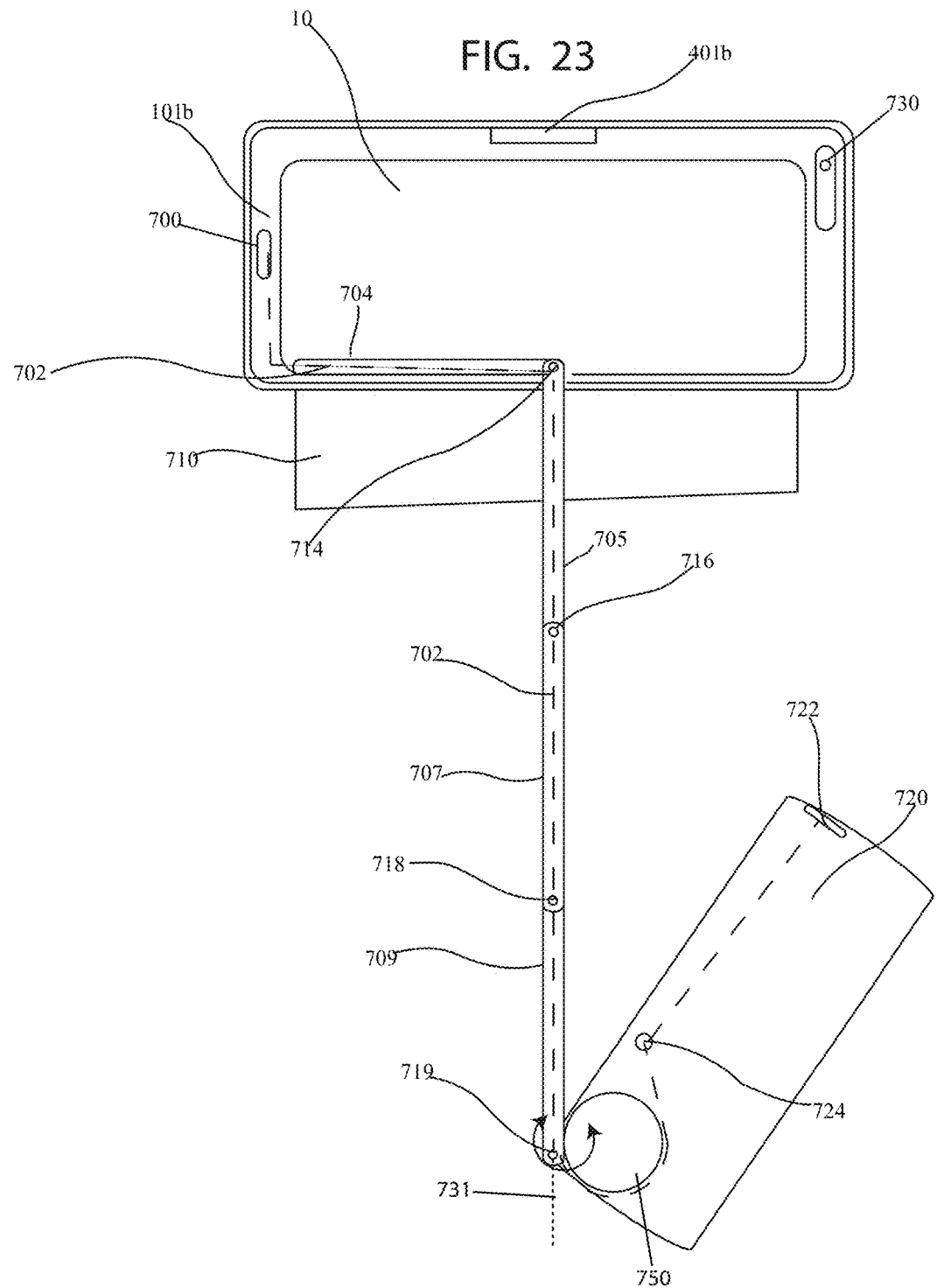

EXTENSIBLE MOBILE RECORDING DEVICE HOLDER

CROSS REFERENCE TO RELATED APPLICATIONS

This application is a non-provisional application of Provisional Application Ser. No. 62/344,239 filed on Jun. 1, 2016 the disclosure of which is hereby incorporated herein by reference in its entirety.

BACKGROUND OF THE INVENTION

At least one embodiment of the invention relates to a device configured for encasing a mobile recording device for protection and/or table-top standing and orientation and features segment arms that do not extend beyond the perimeter of the mobile recording device. Similarly, attachable extension holders for mobile recording devices such as monopods or Selfie-sticks' which may be collapsible, are well known to give users increased extension and therefore better perspectives while taking photographs or recording audio and video. These latter devices, while affording the user extended and alternate vantage points for photography and video recording beyond the normal range of their arms, are substantially independent of the recording device and non-integral due to their size and form factors. In fact, relevant authorities of many popular venues have banned such sticks as a danger and or nuisance. None of this prior art shows an invention that affords the great benefits of shifting and extending the perspective and position of optical, acoustical, and other sensing and recording devices in one form-factor and that can be manipulated to be substantially integrated within the recording device covering for convenience of portability and related availability.

One embodiment of the invention at hand relates to a more integral and discreet device for extending and handling portable recording devices comprising a recording device covering with at least one pivot point and at least two segment arms rotationally mounted to each via a coupler so as to afford substantial extension of the segment arms beyond the perimeter of said recording device covering when the segment arms are rotated towards each and therefore will serve as an extended handle for the recording device.

Another embodiment shows at alternate methodology for achieving a similar result: a recording device covering with at least one segment arm and at least one pivot point mounted on the perimeter of the recording device such that when the segment arm is pulled down from the closed position the arm can be held by the user and the recording device is extended further than the user's hand holding the recording device or recording device covering directly.

SUMMARY OF THE INVENTION

What is outlined is at least one embodiment of a device for extending and handling a portable recording device comprising a recording device covering with at least one pivot point and at least two segment arms rotationally mounted to each via a coupler so as to afford substantial extension of the segment arms beyond the perimeter of said recording device covering when the segment arms are rotated towards each and therefore will serve as an extended handle for the recording device.

Another embodiment shows at alternate methodology for achieving a similar result: a recording device covering with at least one segment arm and at least one pivot point mounted on the perimeter of the recording device such that when the segment arm is pulled down from the closed position the arm can be held by the user and the recording device is extended further than the user's hand holding the recording device or recording device covering directly.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 17A is a view of an omnidirectional end of an arm;

FIG. 20 is a view of a locking arm having both a locking cable and a power cable;

FIG. 21 is a view of the locking arm in an unlocked position;

FIG. 22 is a view of the locking arm wherein there is only a locking cable; and

FIG. 23 is a view of a locking arm wherein the power cable forms the locking cable.

DETAILED DESCRIPTION OF PREFERRED EMBODIMENTS

Figure 1:
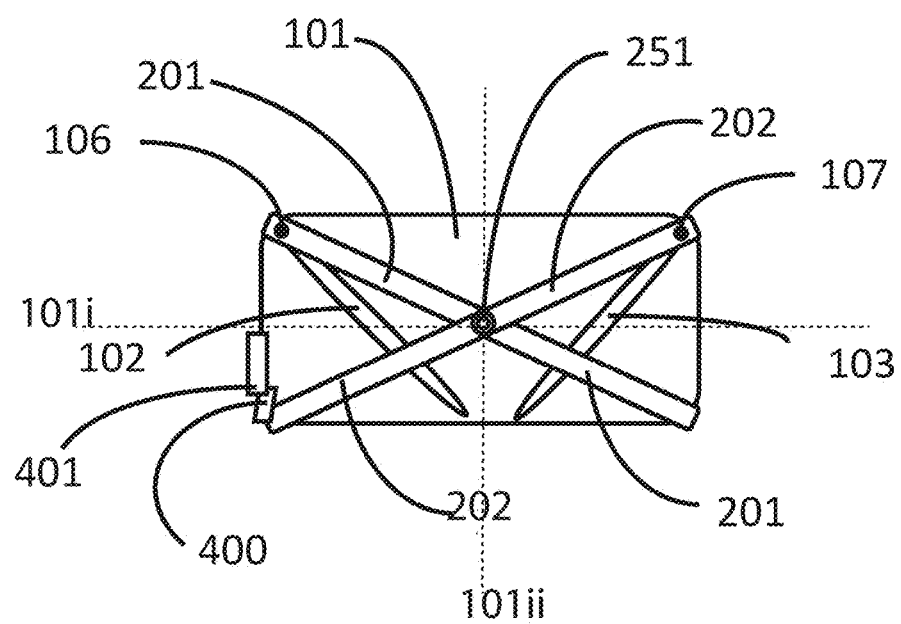
FIG. 1 is a rear perspective of one embodiment of the extensible mobile recording device holder which is shown in the retracted position.

Referring to the drawings, FIG. 1 is a rear perspective of one embodiment of the extensible mobile recording device holder. In at least one embodiment the mobile recording device can be any one of a camera, a portable phone such as a smart phone or any other suitable recording device.

The device includes a primary recording device covering 101 with integrated first track 102 and integrated second track 103 into which first track pin 106 and second track pin 107 are retained respectively. These tracks such as track 102 and track 103 are formed as channels which allow and/or receive a pin which is slidable in this channel or track such as pin 106 or pin 107 which is slidable in this track. At ends opposite the current position of pins 106 or pins 107 are narrowed sections of this track 103 or track 102.

First segment arm 201 is rotationally affixed to first track pin 106 thereby affording sliding travel along and immediately above the longitudinal centerline of first track 102. In the same manner, second segment arm 202 is rotationally affixed to second track pin 107 thereby affording sliding travel along and immediately above the longitudinal centerline of second track 103. First segment arm coupler 251 attaches first segment arm 201 with second segment arm 202 while allowing rotation of both segment arms about the axis of first segment arm coupler 251. The segment arms may be shaped substantially flat and straight as shown in this embodiment. Alternatively, the segment arms as well as the tracks may be curved. Segment arm coupler 251 is shown at the approximate midpoint of the two segment arms 201 and 202 however the segment arm coupler of this embodiment or other segment arm couplers of other embodiments may be affixed at various positions along the segment arms rotationally coupled.

Latch tab 400 is affixed to the user-proximal end of either of the most user-proximal segment arms, in this depiction, second segment arm 202. In this embodiment, the mechanism is locked in the closed position by virtue of latch tab 400 having been retained by latch tab release button 401.

Figure 2:
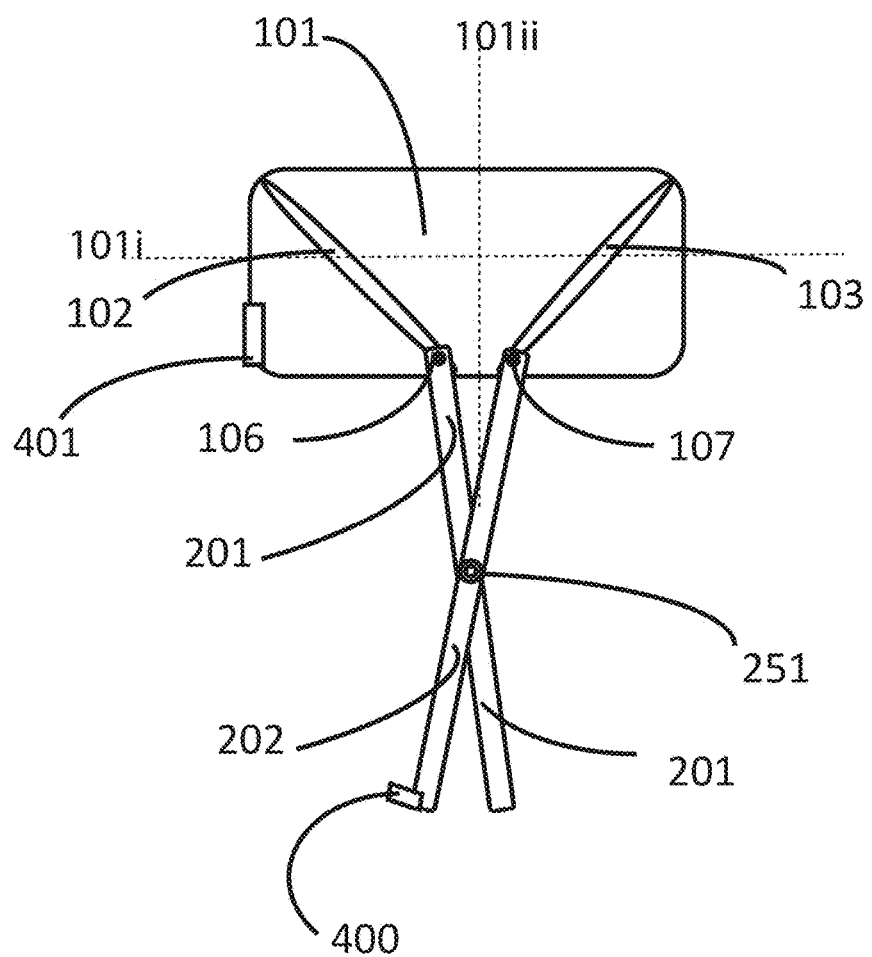
FIG. 2 shows the same embodiment of FIG. 1 but in the extended position.

FIG. 2 shows the same embodiment of FIG. 1 but in the extended position. To achieve this from the closed position shown in FIG. 1, the user would have pressed or slid tab release button 401 so as to remove the constraint of latch tab 400. First segment arm 201 and second segment arm 202 could then be pulled down by the user thereby causing the respectively attached first track pin 106 and second track pin 107 to slide down and inward along respective first track 102 and second track 103 and for first segment arm 201 and second segment arm 202 to rotate towards each other about the axis of first segment arm coupler 251. This position of the pins 106 and 107 at their opposite position show that either ends of the tracks are narrowed and curved so as to gradually slow the movement of these pins in these tracks and to also friction fit these pins in place so that the pins can remain in a substantially but temporarily fixed position at either end of these tracks.

Figure 3:
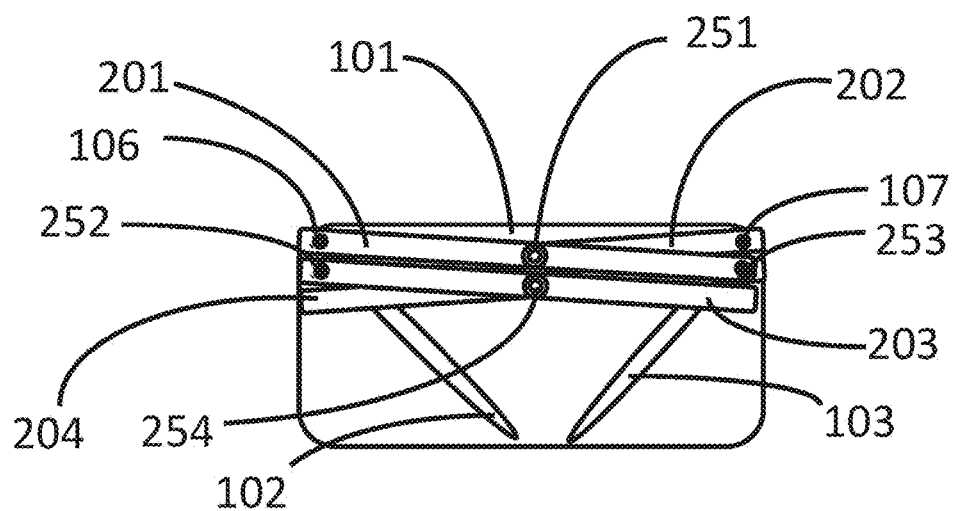
FIG. 3 is an alternate embodiment in the closed position with additional segment arms for the affordance of greater extension.

FIG. 3 is an alternate embodiment with the affordance of greater extension via added segment arms. This embodiment is the same as the embodiment depicted in FIG. 1 but with a third segment arm, wherein third segment arm 203 is coupled to second segment arm 202 on the user-distal end of segment arm 203 via second segment arm coupler 252. There is also a fourth segment arm, wherein fourth segment arm 204 is coupled to first segment arm 201. Third segment arm 203 is also rotationally coupled to fourth segment arm 204 via fourth segment arm coupler 254.

Figure 4:
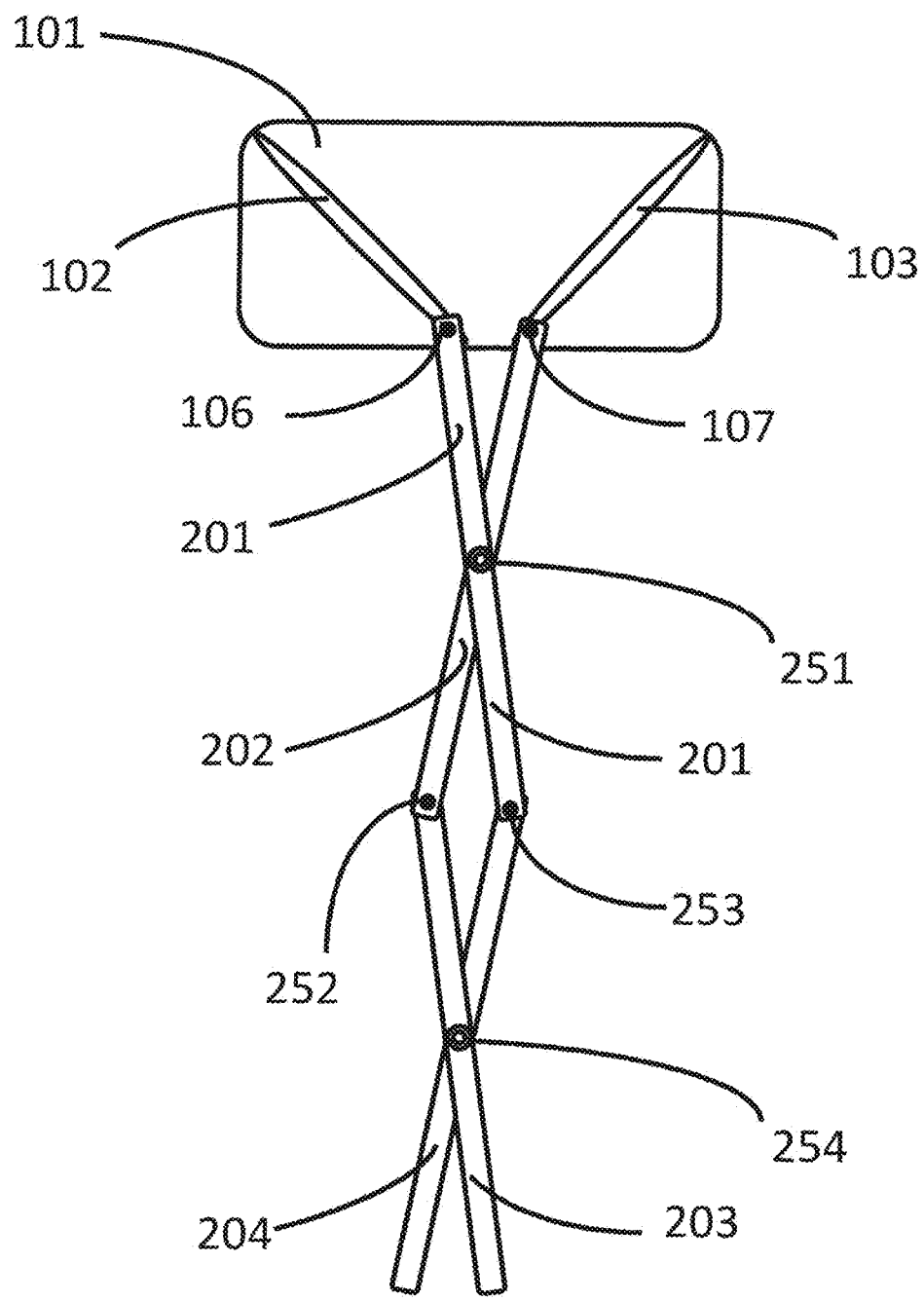
FIG. 4 shows previous embodiment in the extended form.

FIG. 4 features the previous embodiment but with the device in the extended position. In this view each of these arms are shown in a scissor like position with the arms shown rotationally coupled to each other. Due to the additional arm segments the recording device can extend to a longer extent than the embodiment shown in FIG. 1.

Figure 5:
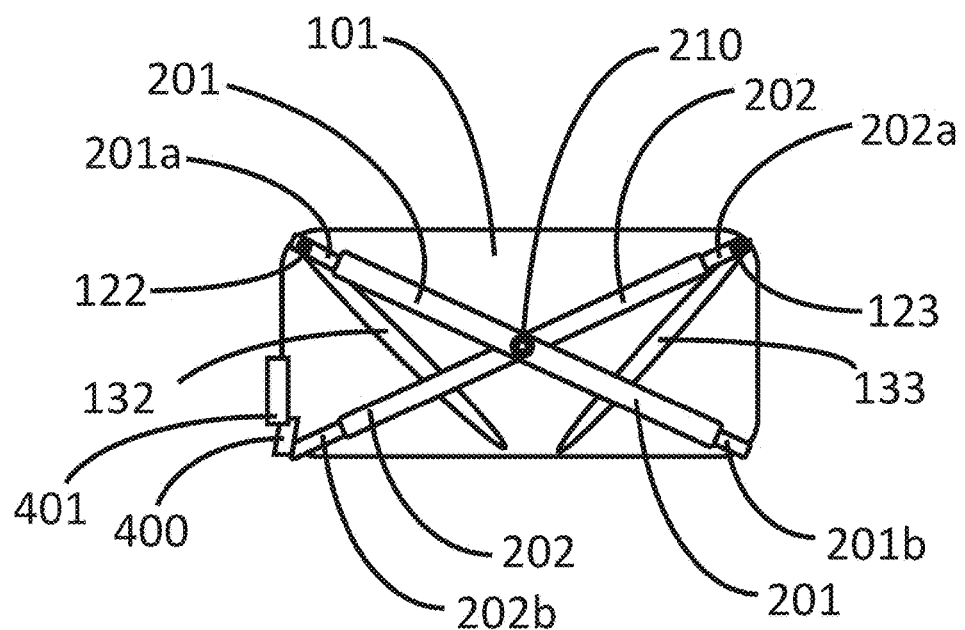
FIG. 5 shows an alternate embodiment with internal slide out segment arm top and bottom extensions.

FIG. 5 shows an alternate completely retracted embodiment with internal slide-out segment arm top and bottom extensions. First segment arm top extension 201a is a smaller segment arm that slides in and out of a partially or fully enveloping channel in first segment arm 201 in a substantially telescoping manner. First segment arm bottom extension 201b is integrated in an identical manner but to the bottom of first segment arm 201.

Second segment arm top extension 202a and second segment arm bottom extension 202b are integrated in an identical fashion with second segment arm 202 as the segment arm extensions 201a and 201b do with first segment arm 201 respectively. Thus, second segment arm extension 202a and 202b operate in a telescoping manner with segment arm 202. This embodiment is shown with latch tab 400 retained by latch tab release button 401.

Figure 6:
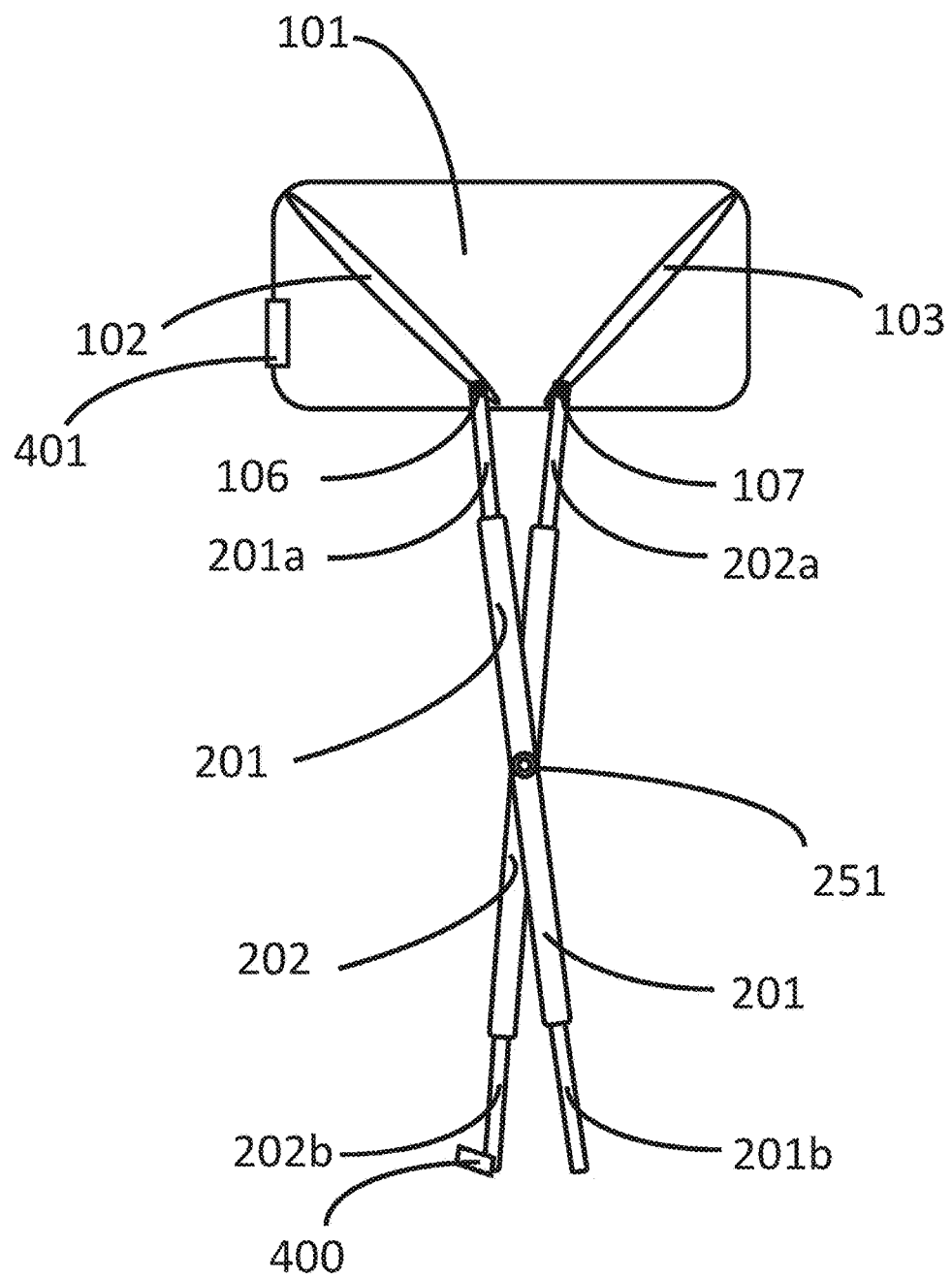
FIG. 6 shows the embodiment depicted in FIG. 5. in the extended position.

FIG. 6 shows the embodiment depicted in FIG. 5 but in the fully extended position. This configuration would have been achieved from the retracted position by the user having pressed or slid tab release button 401 so as to remove the constraint of latch tab 400. The user would then have pulled down on one of the segment arms or segment arm bottom extensions. Continued application of downward force from the user upon the user-proximal ends of a bottom segment arm would result in this fully extended position. With this design, there are fewer crossing interactions for the arms than as shown in the embodiment of FIG. 4, however with these telescoping extensions this allows a greater length to the extensions of the arms than with a single criss-crossing extension.

Figure 7:
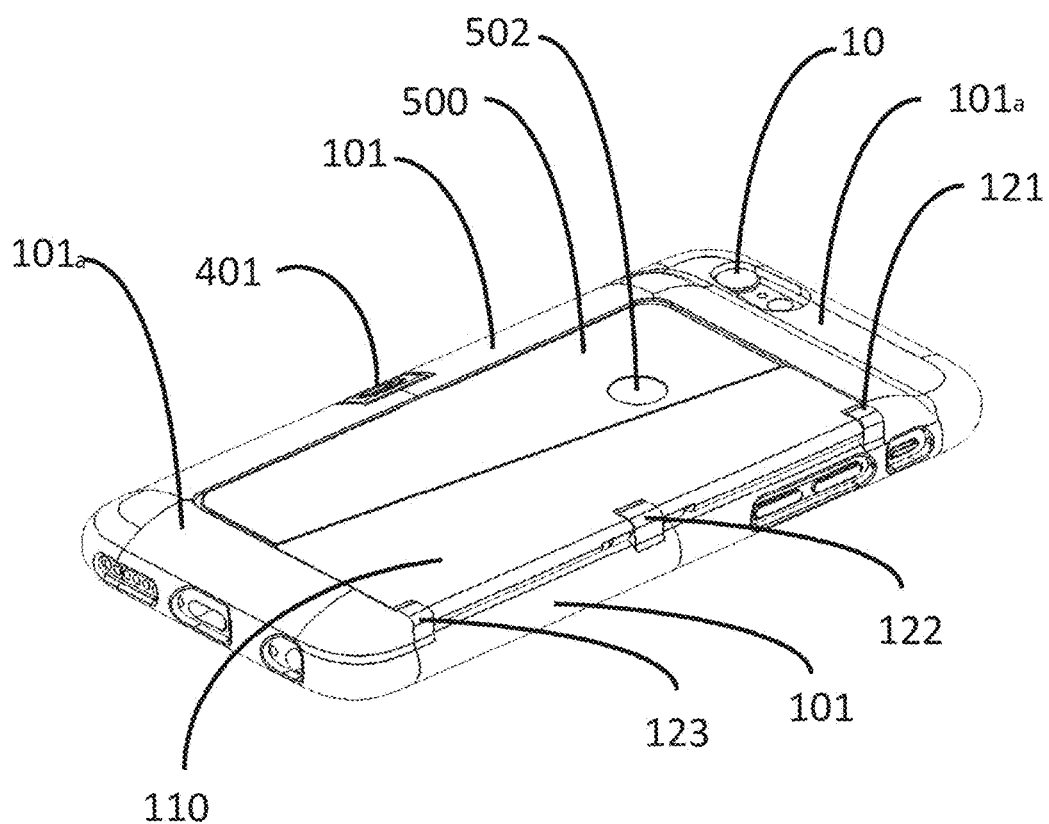
FIG. 7 is substantially isometric right, bottom, and rear perspective of an alternate embodiment of the extensible mobile primary recording device holder in the arms retracted and door closed position.

FIG. 7 is a substantially isometric right, bottom, and rear perspective of an alternate embodiment of the extensible mobile recording device holder with the arms retracted and the optional device mechanism covering 110 in the closed position. This view also shows the primary recording device 10 having on primary recording device covering 101a for access to elements of the primary recording device 10 for which the invention is designed to manipulation. The device mechanism covering 110 is rotationally mounted onto primary recording device covering 101a via first hinge 121, second hinge 122, and third hinge 123. This perspective view of this embodiment also depicts signal transmitter button 502 mounted into handle 500. Signal transmitter button 502 is in communication with primary recording device 10 to control at least one operation of the primary recording device. The signal transmitter button 502 is retained into primary recording device covering 101a along with the segment arms and connected parts previously described, and device mechanism covering 110 by the engagement of latch tab 400 by latch tab tooth 402 (See FIG. 8) which in turn is integrated with latch tab release button 401.

Figure 8:
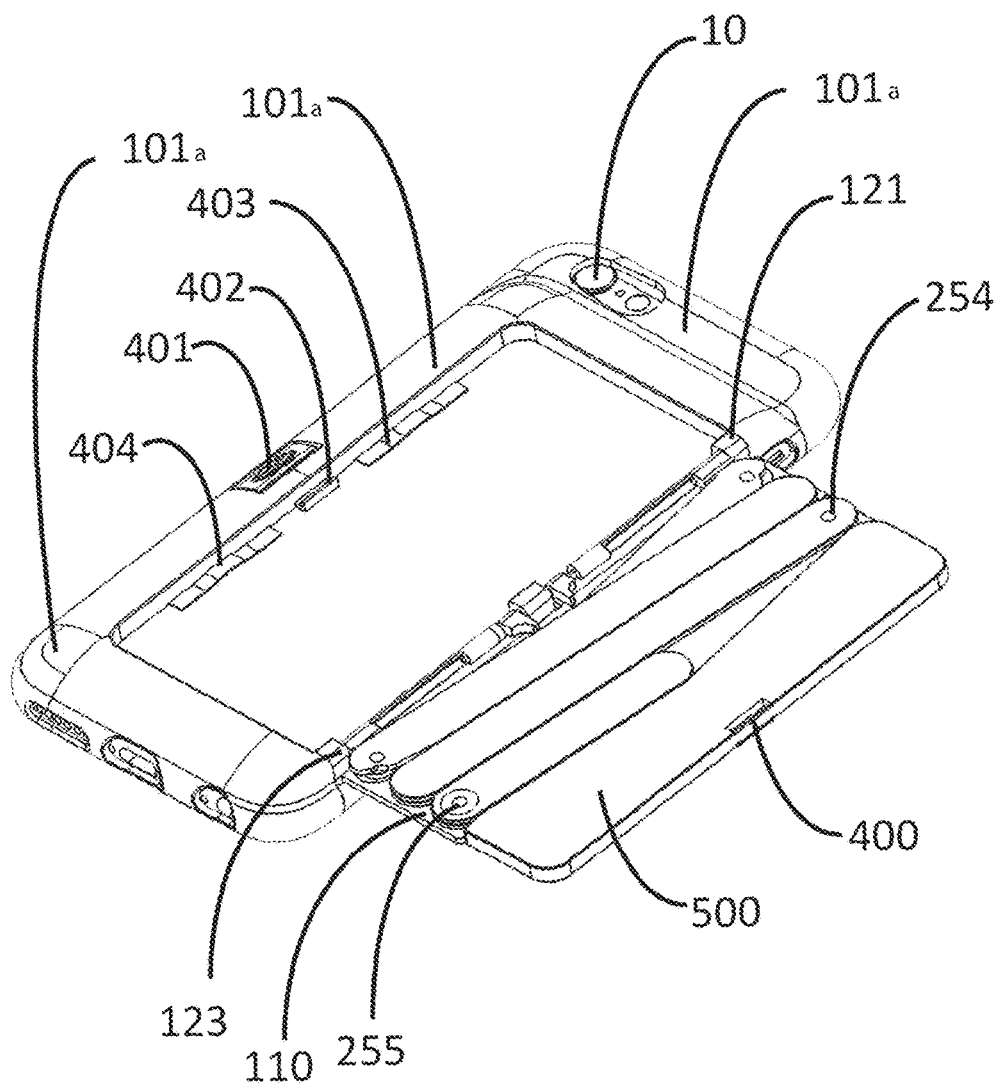
FIG. 8 shows the same perspective of the same embodiment in the previous FIG. but in the door open and arms retracted position.

FIG. 8 shows a similar perspective of the same embodiment in FIG. 7 showing the primary recording device inside a new covering 101*a*. With this view, the door device mechanism covering 110 is open and segment arms still retracted position. This perspective reveals latch tab tooth 402 as well as the optional feature of facilitating the opening of handle 500 and attached segment arm assembly components and device mechanism covering 110 by means of a first ejection spring 403 and second ejection spring 404. Thus, with this design, latch tab release button 401 is configured so that when it is pressed, it releases latch tab 400 so that springs 403 and 404 are configured to open covering 110 so that it rotates around hinges 121, 122 and 123 thereby exposing the arms. The arms can then be extended as shown in FIG. 9.

Figure 9:
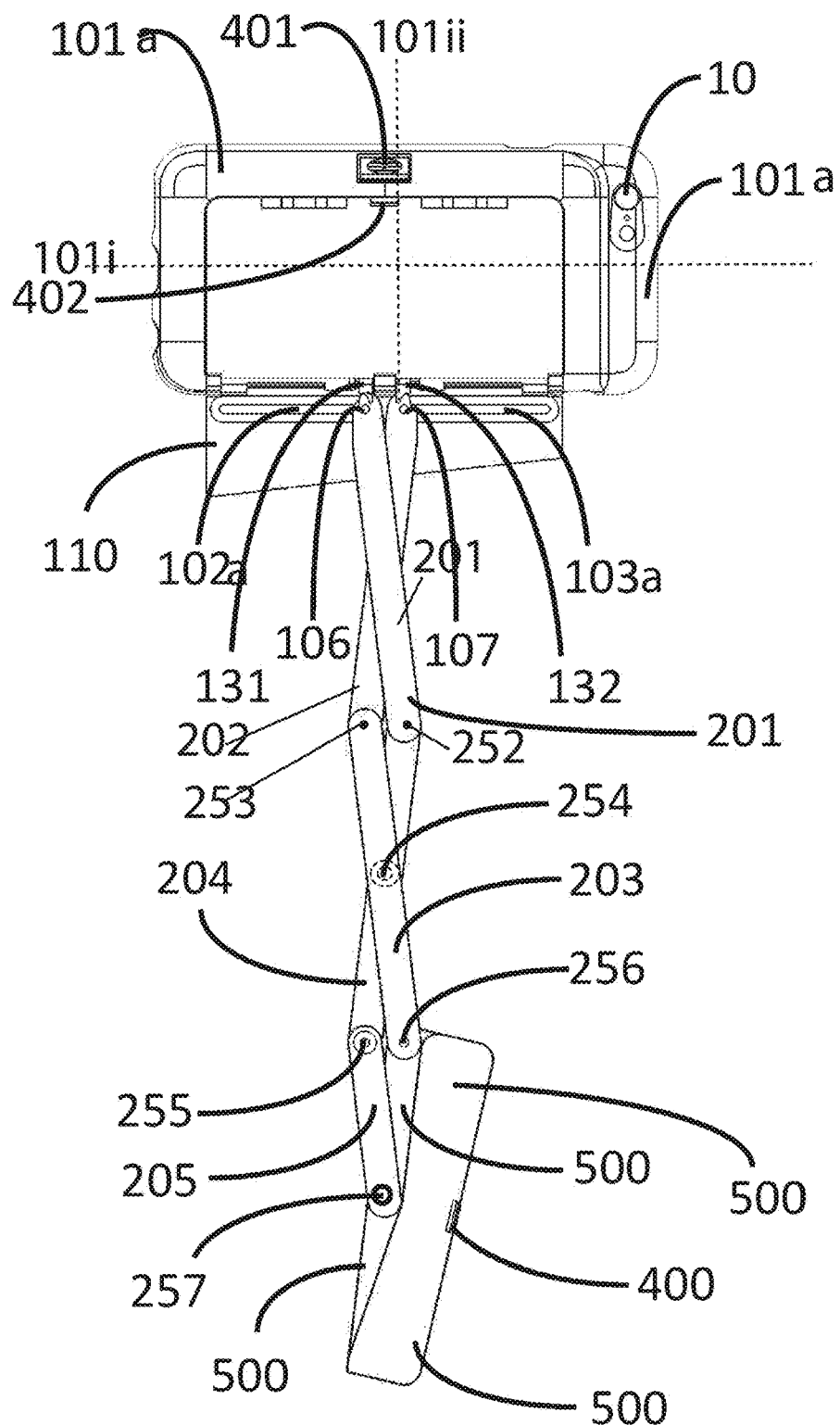
FIG. 9 is a rear perspective of the same embodiment in FIG. 8 but in the door open and segment arms fully extended position.

FIG. 9 is a rear perspective of the same embodiment in FIG. 8 but with the door open and arms fully extended position. One means of having achieved this from the previous perspective is by the user having had pulled handle 500 away from the primary recording device covering 101*a* thereby rotating handle 500 around sixth segment arm coupler 257 and fifth segment arm coupler 256 such that all segment arms such as arms 201*a*, 202*a*, 203*a*, 204*a*, and 205*a* rotate about their respective couplers 252-257 bringing the segment arms towards each other and along the segment arms' longitudinal centerline which is denoted by centerline axis 101*ii* which creates elongation of the extensible mobile primary recording device holder. This centerline axis 101*ii* is transverse to the longitudinal axis 101*i* of the device. This alternate embodiment features the first track 102*a* and second track 103*a* on device mechanism covering 110 with first track pin 106*a* and second track pin 107*a* connecting the segment arms. These respective track pins 106*a* and 107*a* are accordingly slidable in first track 102*a* and 103*a* respectively. Also revealed are first hinge rotation caliper-brake jaw 131 and second hinge rotation caliper-brake jaw 132 which, when moved towards each other by contact with the user-distal ends of first segment arm 201 and second segment arm 202, create resistance to the rotation of device mechanism covering 110 and connected mechanism. This feature affords the locking of the position of primary recording device covering in relation to the segment arms and handle.

Figure 10:
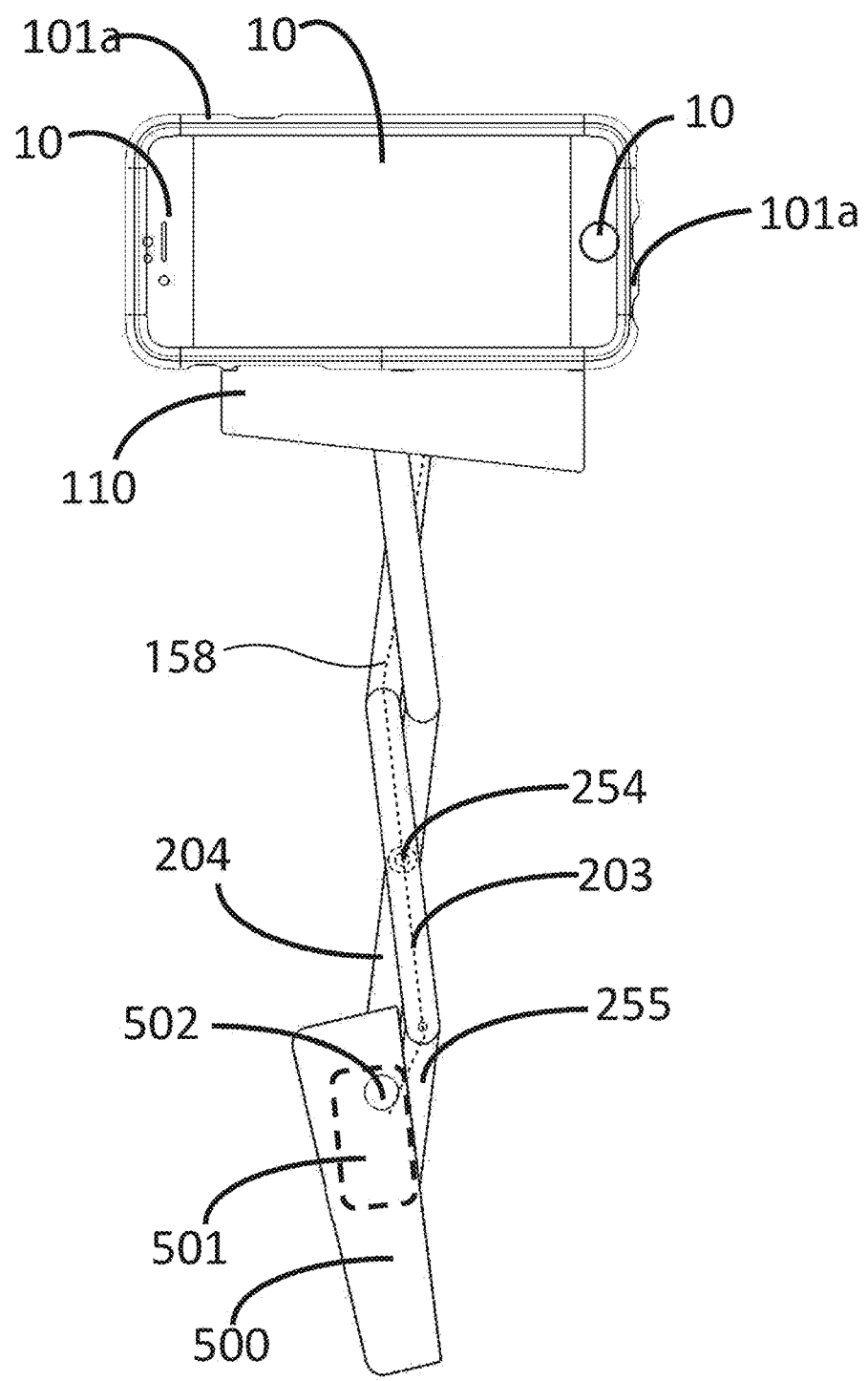
FIG. 10 is a front perspective of the same embodiment and position as depicted in FIG. 9.

FIG. 10 is a front perspective of the same embodiment and position as depicted in FIG. 9. This perspective reveals an optional signal transmitter button 502 which could be used to initiate an event such as the transmission of a signal from radio signal transmitter 501 drawn with a dashed line to connote concealed encasement in handle 500. Radio signal transmitter can be powered either by a separate battery or powered by the power supply of the primary recording device 10. In the event the radio signal transmitter 501 is coupled to the power supply of the primary recording device 10 a line such as a low voltage line 158 extends either within (inside of the body) of the arms such as arms 201*a*, 203*a*, and 205*a* or extend external to the arms from a connection point inside of primary recording device 10 to transmitter 501.

Figure 11:
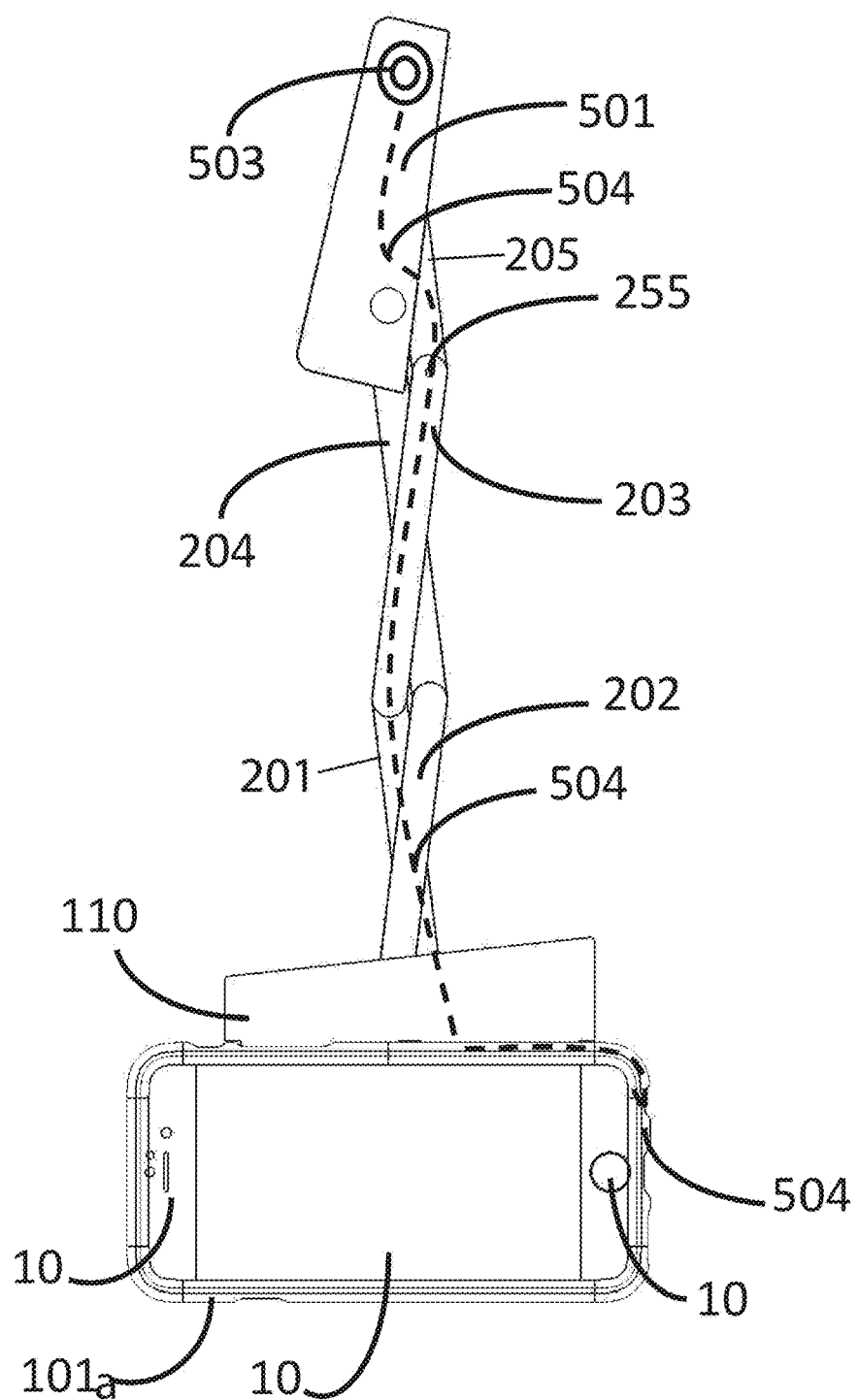
FIG. 11 is a front perspective of the embodiment disclosed in FIG. 10 but with the added feature of auxiliary sensor element and sensor connection cable.

FIG. 11 is a front perspective of the embodiment disclosed in FIG. 10 but with the added feature of auxiliary sensor element 503 such as an optical camera or a microphone that may be electronically integrated with the primary recording device. Power and information may be transferred to and from auxiliary sensor element 503 and primary recording device 10 via sensor connection cable 504 which is connoted by a dashed line to indicate optional concealment within the segment arms such as arms 201, 203, and 205. Alternatively, arms 202 and 204 can also be used to extend the cable 504. This cable 504 extends from device 10, within recording device covering 101 around device mechanism covering 110*a* and up these arms past couplers such as coupler 255 to radio signal transmitter 501 in handle 500.

Figure 12:
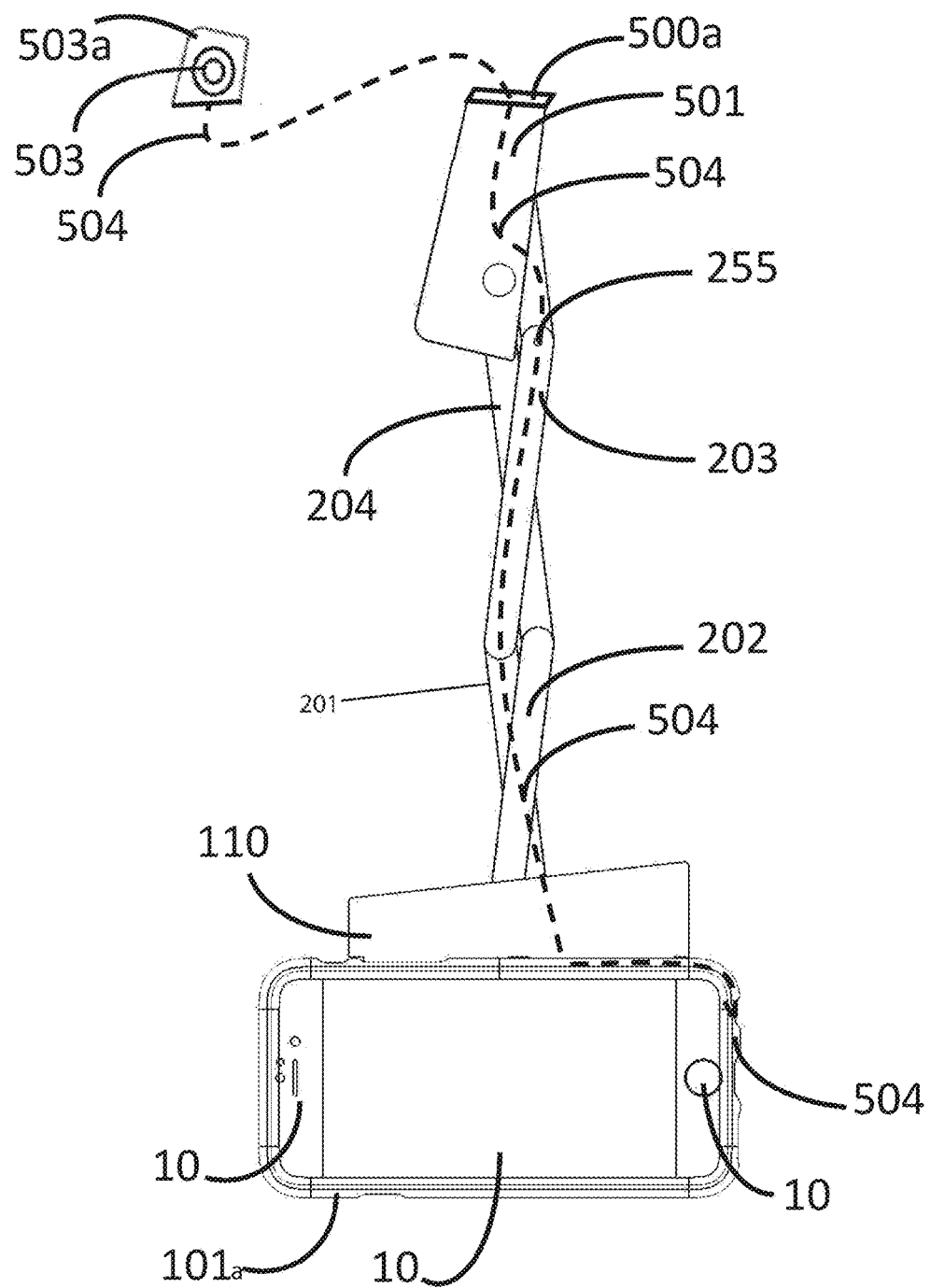
FIG. 12 is the same perspective as FIG. 11 with the same embodiment of the invention but with the added feature of a detachable sensor module.

FIG. 12 is the same perspective as FIG. 11 with the same embodiment of the invention but with the added feature of auxiliary sensor 503 being detachable and re-attachable via the added element of handle module attachment channel 500*a* which, in this embodiment, is substantially U-shaped when viewed from a 90-degree horizontal perspective and of a size just slightly wider than auxiliary sensor module 503*a* so as to allow the module to be retained. Sensor connection cable 504 could be extended in length as shown. to accommodate the detachability of auxiliary sensor module 503*a* from the rest of the device.

Figure 13:
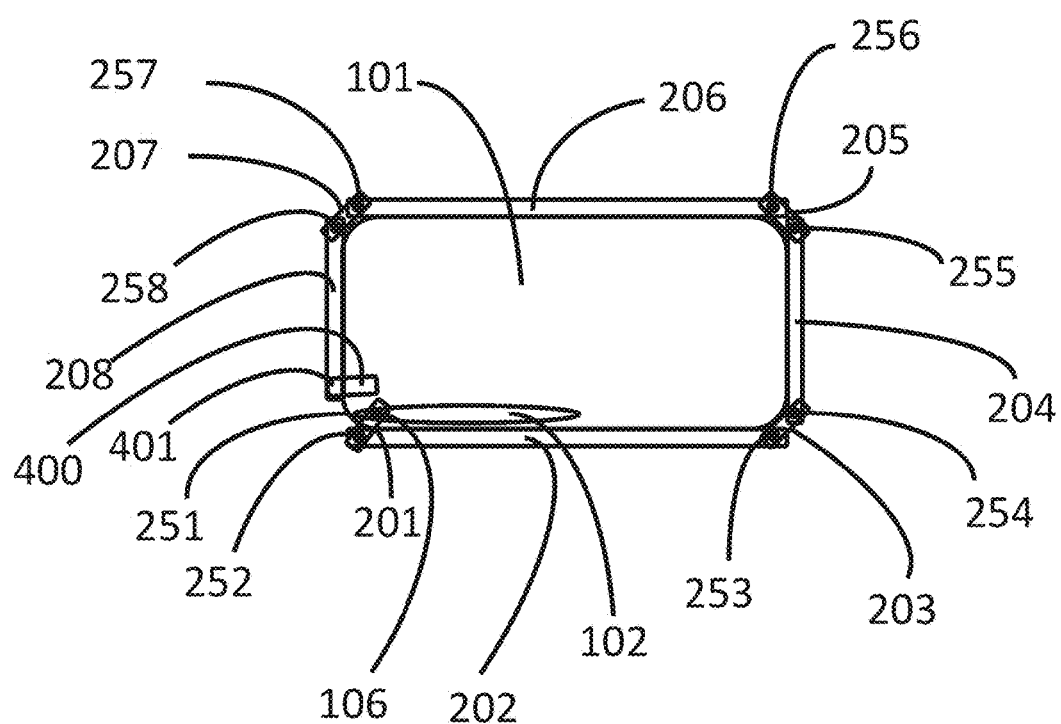
FIG. 13 is a rear perspective of an alternate embodiment of the invention in which the segment arms of the holder are folded around the perimeter of the primary recording device covering.

FIG. 13 is a rear perspective of an alternate embodiment of the invention in which the segment arms of the handle are folded around the perimeter of the primary recording device covering. In this embodiment, the segment arms which are shown in various lengths are rotationally coupled at their substantial endpoints. This embodiment also features first track 102*b* into which first track pin 106*b* is retained but moveable along the horizontal axis of the track. This first track pin 106*b* is also rotationally coupled to first segment arm 201 which is rotationally coupled to second segment arm 202 via second segment arm coupler 252. In this embodiment, second segment arm 202 substantially spans the length of the bottom of primary recording device covering 101 and rotationally connects via third segment arm coupler 253 to segment arm 203 which spans a corner of primary recording device covering 101 to then connect via fourth segment arm coupler 254 to segment arm 204 which substantially spans another side of primary recording device covering 101. In similar fashion, segment arm coupler 255 continues the aforementioned assembly by connecting fifth segment arm 205, rotationally so as with all segment arm couplers in this device. Segment arm coupler 256 then connects sixth segment arm 206 which spans the top of primary recording device covering 101 although this is not critical to the functionality and more segments can be added to achieve finer articulation around the device. Segment arm coupler 257 then joins segment arm 207 to the linkage assembly as does segment arm coupler 258 with eighth segment arm 208 which substantial circumscription of primary recording device frame 101. This folding of segment arms completely around the perimeter of the recording device covering is not an essential attribute to the invention as an alternate embodiment in keeping with the spirit of the invention could partially fold around the frame of a recording device covering. A locking of the segment arms in this folded position around the recording device covering may be achieved via latch tab 400 retained by latch tab release button 401. Latch tab would preferably be placed at the distal end of the segment arm furthest, in terms of linkage connections, from the recording device covering attachment point formed by first track pin 106 in this embodiment, although other latching positions could also be effective.

Figure 14:
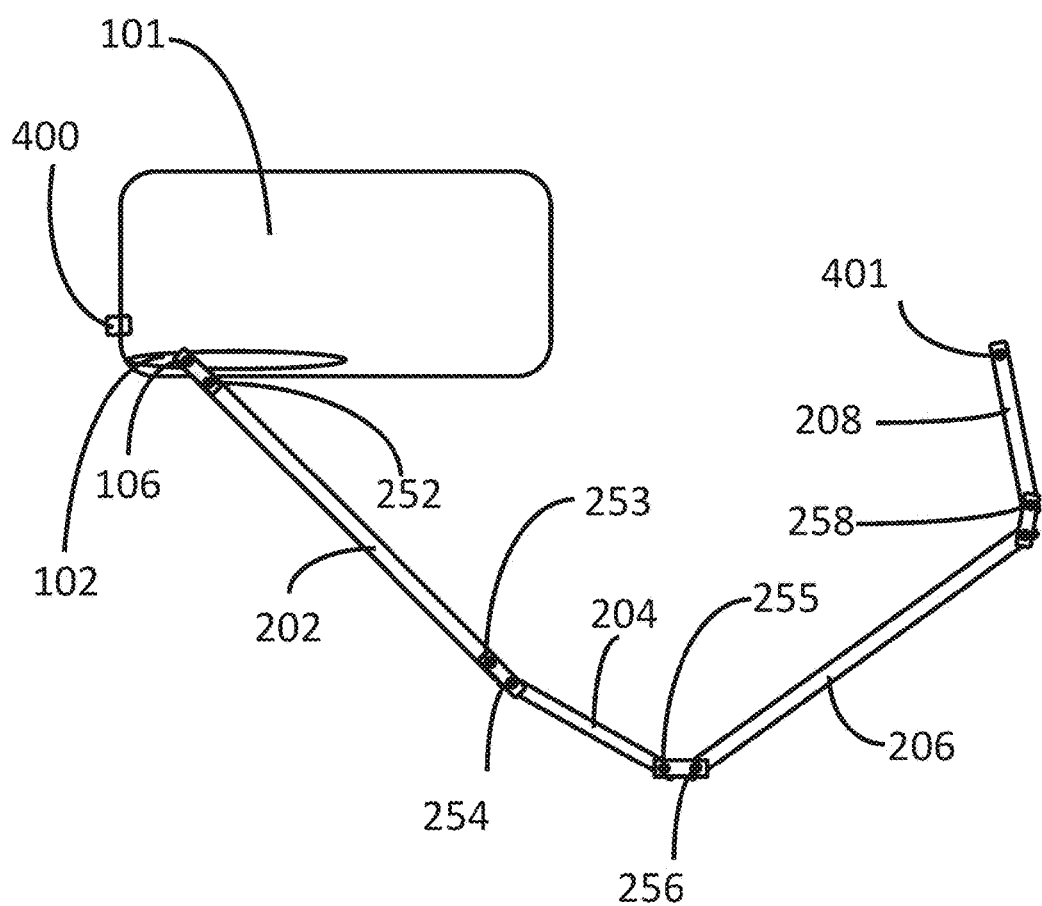
FIG. 14 depicts the embodiment disclosed in the FIG. 13 but in the partially unfolded and extended position.

FIG. 14 depicts the embodiment disclosed in the FIG. 13 but in the partially extended position. To have attained this position from that depicted in FIG. 13's closed position, the user would have release latch tab 400 by sliding latch tab button 401 away from latch tab 400 thereby removing the constraint on attached segment arm 208 which if pulled away from recording device covering 101 would cause rotation around seventh segment arm coupler 258 and all previously described connected segment arms and couplers in this embodiment.

Figure 15:
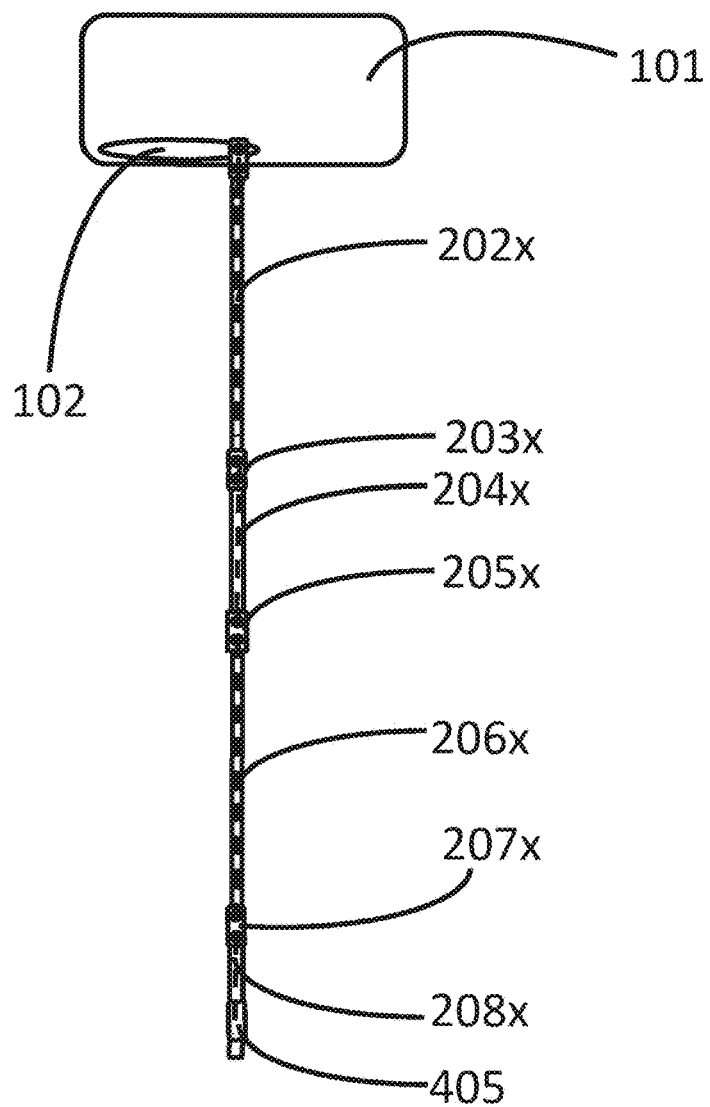
FIG. 15 depicts the same embodiment of FIG. 14 but with the segment arms fully extended and with a locking pushrod mechanism.

FIG. 15 depicts the same embodiment of FIG. 14 but in the fully extended position. For this embodiment and others that feature the affordance of folding around the perimeter of the recording device frame, the segment arms could be shaped will walls on the exterior lengths to serve as stops so as to prevent rotation beyond 180 degrees relative to connected segments so that the segment arms would align in substantially perpendicularly relative to the recording device covering. This figure also features an internal channel in each of the segment arms to accommodate a push rod mechanism illustrated with dotted lines to connote internalization and concealment within their respective segment arms. Locking of the segment arm assembly in the fully extended position would result from first segment push rod 202x which would lock the alignment of first segment arm 201 and second segment arm 202 by virtue of the rigidity it provides when pushed internally between these two segment arms which would result from second segment push rod 203x being pushed internally slightly out of the internal top channel of third segment arm 203, which would result by the abutment and contact from third segment push rod 204x being pushed slightly beyond the top channel of fourth segment arm 204 which would have be caused by the abutment and contact from fourth segment push rod 205x pushed by fifth segment push rod 206x in turn pushed by sixth segment push rod 207x pushed by seventh segment push rod 208x which was initially pushed up by sliding push rod switch 405. Thus a user can lock the alignment of all segment arms by this assembly of pushrods that can slide across the internal channels of the segment arms and across what were the points of articulation between the segment arms rendering them non-articulating.

Figure 16:
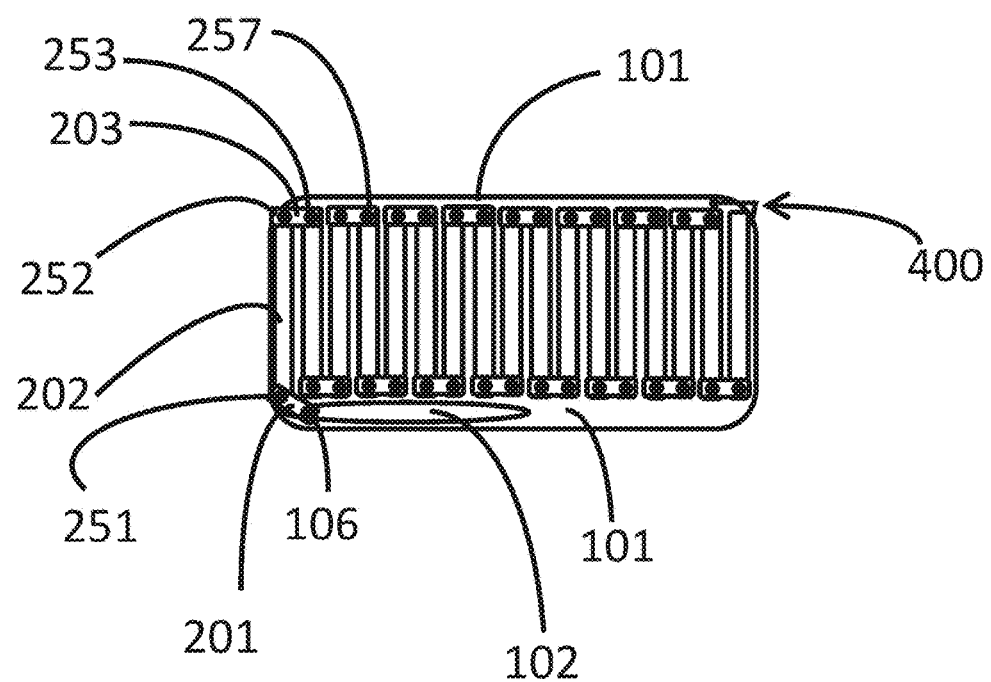
FIG. 16 is a rear perspective of another alternate embodiment of the invention in which the segment arms of the handle are retracted and folded for storage on the rear surface of the primary recording device covering.

FIG. 16 is a rear perspective of an alternate embodiment of the invention in which the segment arms of the handle are retracted and folded for storage on the rear of the recording device covering.

Figure 17:
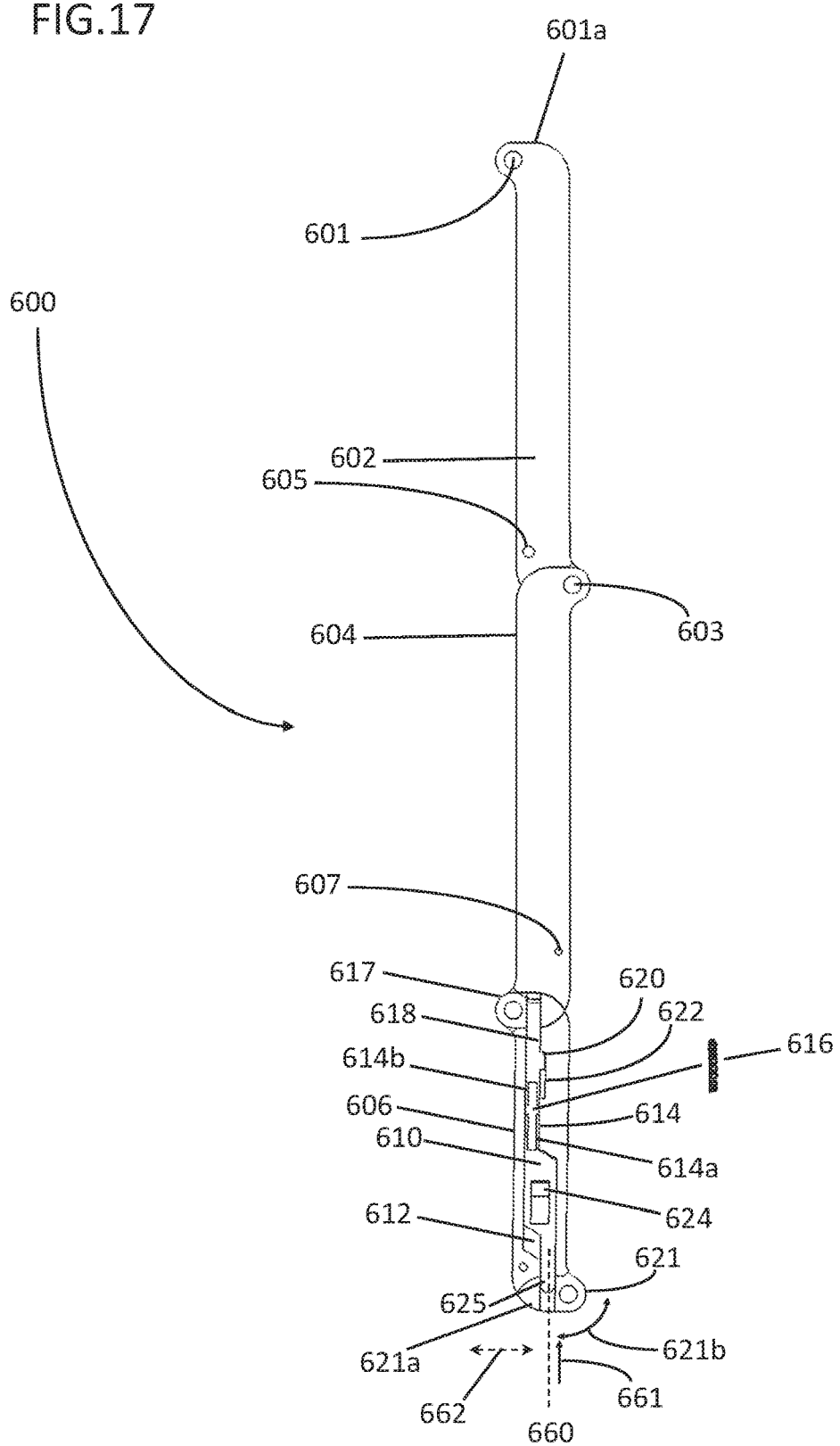
FIG. 17 is a view of another embodiment of an arm that is selectively lockable.

FIG. 17 is a view of another embodiment of an arm that is selectively lockable. With this embodiment, there is an arm 600 which is selectively connectable to a recording device such as recording device 10 which in at least one embodiment can be a smartphone. With this embodiment, there is an arm 602 which has at one end a link section 601 and at another section a link section 603. An additional arm 604 or second arm is coupled at link end 603, and at an opposite end via link 617. A third arm 606 is shown exposed with a slide button mechanism 624 being shown slidable inside of arm 606. Push button 624 is coupled to a slidable body 610 which is slidable in a chamber 612 which has a beveled edge to catch or stop the slidable body 610. An extension 625 extends out from body 610. A link end 621 is formed at the end of the arm 606 as well. As shown there is a spring 616 which is shown being able to be fit inside of two forks 614 forming a chamber for the spring inside of arm 606. In addition, there is a tab 620 which is slidable inside of a tab chamber which allows for the axial motion of body 610 inside of the chamber. There is an arm 618 which is slidable into the linkage area which includes linkage 617 thereby locking this linkage in place. This type of movement also occurs inside of arms 604 and 602. Thereby selectively locking linkage 603 in place.

For example, there are two ends 601a and 621a. At first end 601a there is a substantially static connection wherein at point 601, an object such as a handle or a recording device such as device 10. At the opposite end is a pivot end 621a as well. This pivot end 621a is an omnidirectional pivot end that allows for rotation about at least two axes such as two axes that are transverse to each other. When button 624 is pressed and driven in the direction of arrow 661 it drives the extension back inside of the arm, and away from a linkage connection. This movement of the extension allows for rotation of any device connected at this end such as a handle or a recording device. This movement allows for rotation about link 621 as well as movement in a direction transverse to the rotation about link 621 as well. The movement of this extension 625 also translates into a movement along axis 660 of other components freeing up the links 617, 603 and 601. In addition, at pivot end 621a the movement of extension 625 allows also for a rotation along arrow line 621b as well as a rotation of an object such as a handle or a recording device 10, in a direction transverse to the direction of arrows 621b. For example, the direction of rotation of this object could be around an axis line 662 or around an axis line substantially parallel to axis line 662 allowing for substantially omnidirectional movement of an object such has a handle such as handle 620 or an object such as device 10.

To further illustrate the omnidirectional rotation of this end such as end 621a FIG. 17A shows two axes of rotation 621d and 662 which illustrate the two different pivots or links 621 and 662b which are similar to each other but positioned transverse or substantially perpendicular to each other so that this allows for omnidirectional rotation of an object at this end along a nearly infinite number of different rotating positions. Both of these links 621 and 662b are coupled to arm 606.

As discussed above the different ends 601a and 621a can have different levels of rotation or adjustability such that one end could be an omnidirectional end and the other end is simply a rotational end with another object simply being rotatable about a single axis. However, in at least one embodiment, both ends such as ends 601a and 621a could be omnidirectional ends having pivots or rotational axes in at least two directions.

Figure 18:
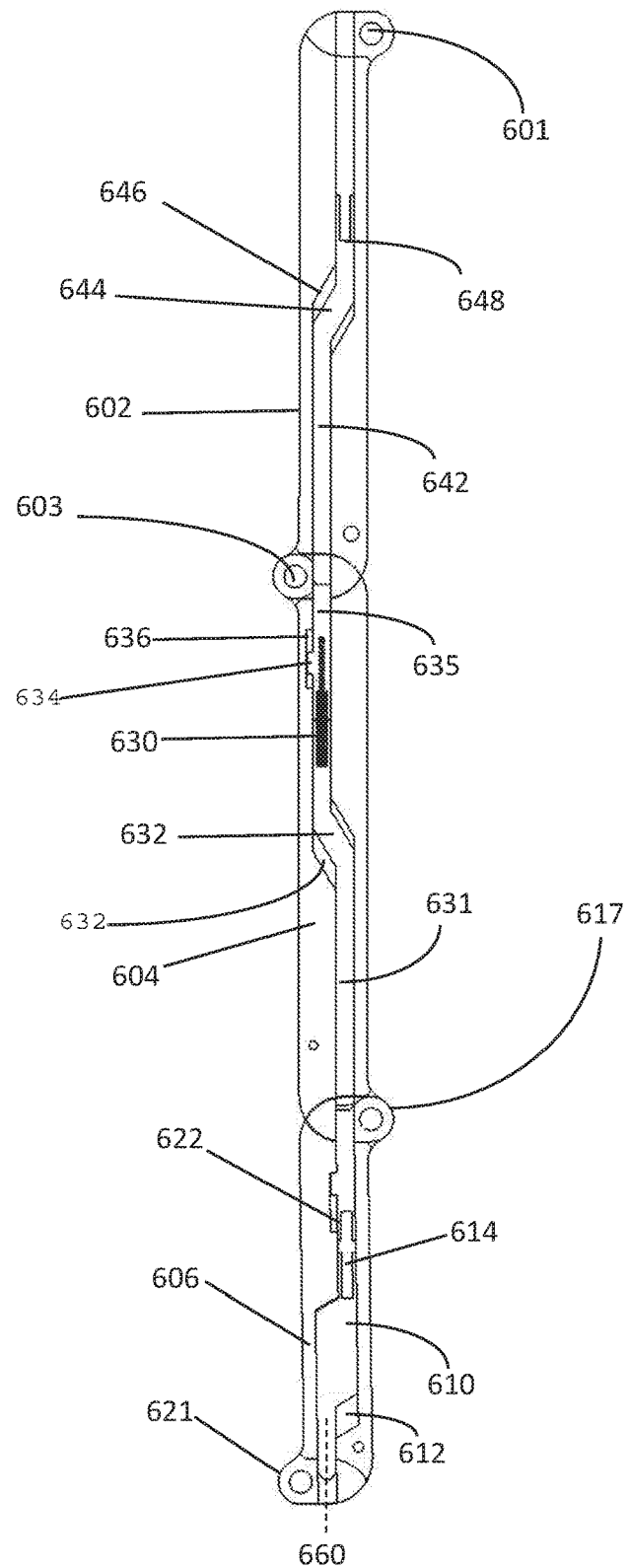
FIG. 18 is a view of the embodiment of FIG. 17 which shows a view with plates removed from the arms.

FIG. 18 shows a cross-sectional view of the different arms 602, 604, and 606 showing the different inner linkages and push rods disposed therein. For example, there is slidable body 610 which is slidable inside of chamber 612. The two forks receiving area 614 is configured to receive spring 616 of FIG. 17. A push rod 631 is shown slidable across linkage 617 wherein this push rod has an angled section 632 which is slidable inside of angled chamber 634. A spring 630 is configured to bias the push rod 631 towards locking inside of linkage section 617 when arm 604 is aligned with arm 606 thereby creating a slidable channel within linkage section 617. A spring 630 is positioned adjacent to angled section 632 of push rod 631 and is also used to bias push rod section 635 thereby driving tab 634 inside of chamber 636 to cause push rod section 635 to move towards linkage section 603. Another push rod 642 disposed inside of arm 602 has an angled section 644 which is slidable inside of angled chamber 646, thereby allowing selective axial displacement of these push rods along an axis 660 which is a longitudinal axis of the extension of these arms. A fork 648 is configured to receive a spring (not shown) which is selectively disposed within these forks. In addition, linkage 601 is also shown which is also selectively lockable with the movement of these push rods into these linkage joints.

Figure 19:
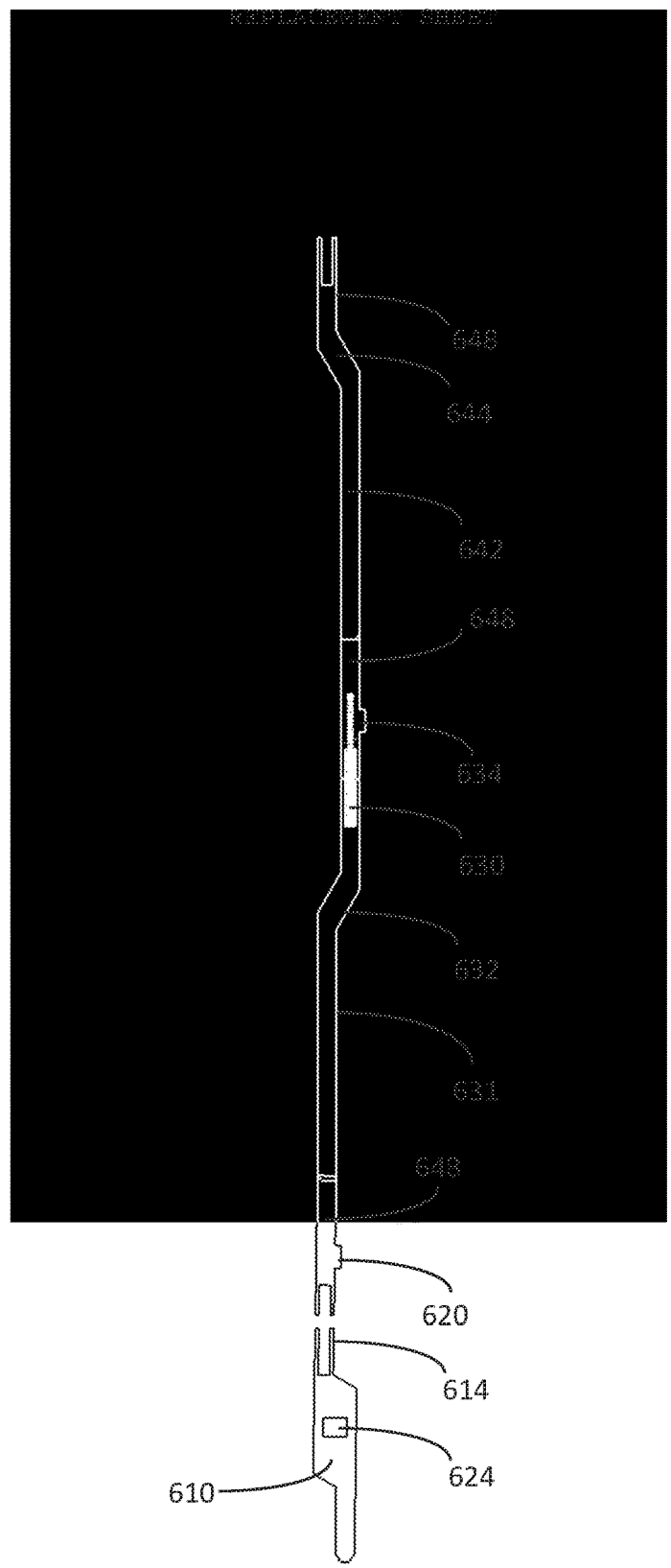
FIG. 19 is a view of the locking shaft outside of the arms.

FIG. 19 is a view of the locking shaft or push rod outside of the arms. For example, there is shown slidable body 610 which has slide button 624 which is configured to be selectively slidable to lock the linkages into alignment.

Opposing forks 614a and 614b are configured to receive a spring, which are configured to drive push rod 618 having tab 620 into push rod 631. Push rod 631 has an angled section 632 which extends towards a chamber having a spring 630. Push rod 635 has a tab 634 and is positioned adjacent to push rod 642. Spring 630 is configured to drive the two push rods 631 and 635 in opposite directions into the linkage areas to thereby stop the rotation of these linkages or hinges. Push rod 642 is also driven as well so that it pushes on angled section 644 and towards fork section 648 where another spring can be positioned and used to lock these push rods in an internal region thereby locking these linkages such as linkage 601, 603, 617 and 621 into alignment (See FIG. 18) thereby locking the axial movement of these arms along axis 660 (FIG. 18) to create a straight aligned set of arms which allows for controlled handling by a user.

FIG. 20 is a view of a locking arm having both a locking cable or line 712 and a power cable or line 702. With this design, there is device 10 having a cover 101b, wherein cover 101b is configured to allow cover 710 to fold out from cover 101b. Cover 710 allows arms 705, 707, and 709 to fold out and to be selectively locked by line or locking cable 712. Locking cable or line 712 is held in place via a first pin 713 and extends down through arms 705, 707, and 709 to handle 720. When these arms 705, 707 and 709 are extended, this creates a little slack in the line 712. At one end of the line 712 is a fastener 713 which fastens the line 712 to the cover 101b. This fixes the line 712 at a first end. Then as the handle 720 is rotated, line 712 is pulled on pin or fastener 713 so that the cable becomes taught.

At the opposite end of the line 712 and inside of handle 720 is a cam 750 which is a rounded or oval shaped cam. Cable 712 extends around cam 750 such that when handle 720 rotates, the cable 712 extends around cam 750 creating a greater length to be drawn on cable 712 when handle 720 is rotated in a counter-clockwise manner.

The slack is taken up by rotating handle 720 so that it takes up the slack thereby creating tension on locking cable 712 thereby locking these arms in place. This prevents any rotational motion around any one of the linkages such as linkage 714, 716, 718, or 719, so that the user can hold handle 720, forcing arms 705, 707 and 709 to extend along axis 731 while keeping the recording device 10 in place thereby allowing recording element 730 to be held steady.

In addition, disposed inside of handle 720 is a button 722 which is coupled to an electrical and signal line 702 which is also coupled at an opposite end to electrical connection element 700. Electrical connection element 700 is coupled to a power supply and a signal controller so that power and signals can flow out from this electrical connection element 700 towards button 722 and also inside of device 10. When the device including the arms 701 is folded up, the handle 720 forming a cover is put in place adjacent to cover 710 to close the arms inside these covers.

FIG. 21 is a view of the locking arm in an unlocked position. Arms 705, 707 and 709 are shown bent vs. each other with handle 720 rotated in a clockwise manner vs. the orientation of FIG. 20. This orientation of handle 720 shows that if handle 720 is rotated in a counter-clockwise manner, around link or hinge 719, it causes greater tension in cable or line 712, thereby automatically straightening out arms 705, 707 and 709, due to the tension created in line 712. Due to the grip that the user may have on handle 720, this causes handle 720 to rotate towards arm 709 thereby straightening out these arms and forcing them to extend along axis 731 shown in FIG. 20.

FIG. 22 is a view of the locking arm wherein the locking cable 712 is disposed therein. With this embodiment, only the locking cable which extends from pin 713 through arms 705, 707, and 709 is used. An electrical or signal line or cable 702 is not used. Instead, the locking cable 712 is used and a button, if necessary, is used as a wireless signal button such as but not limited to Bluetooth or WiFi signal button.

Alternatively, FIG. 23 shows the signal line 702 which is configured to act as the locking cable to lock the arms 705, 707, and 709 in place using the rotation of handle 720. Signal line 702 extends from electrical connection 700 through the arms past the links or hinges 714, 716, 718, and 719 to thereby lock the arms in place along an axis such as axis 731 when handle 720 is rotated in place around the cam 750.

Thus, this design creates a lockable system which locks the arms in place such that the cable or line 702 or line or cable 712 locks these arms in place so that a user can then have a steady control over a recording device.

Accordingly, while only a few embodiments of the present invention have been shown and described, it is obvious that many changes and modifications may be made thereunto without departing from the spirit and scope of the invention as defined in the appended claims.

What is claimed is:

1. A device for extending and handling portable recording devices comprising:
   a. a recording device covering with at least one pivot point;
   b. at least two segment arms;
   c. at least one coupler connecting said at least two segment arms and
   wherein said at least two segment arms are configured for substantial extension beyond the perimeter of said recording device covering when the segment arms are rotated about said at least one coupler;
   at least one track having a narrowed section that tapers at one end, said at least one track being disposed within said recording device covering, and
   at least one track pin, wherein said at least one track pin is coupled to at least one of said at least two segment arms.

2. The device as in claim 1, further comprising at least one track disposed within said recording device covering, and at least one track pin, wherein said at least one track pin is coupled to at least one of said at least two segment arms.

3. The device as in claim 1, further comprising at least one additional track disposed within said recording device covering, and at least one additional track pin wherein said at least one additional track pin is coupled to another of said at least two segment arms and wherein each of said two segment arms are rotationally coupled to said at least one track pin and said at least one additional track pin.

4. The device as in claim 1, wherein said at least one coupler comprises a rotational hinge configured to rotationally couple at least two arms together.

5. The device as in claim 1, wherein said at least one handle is rotationally coupled to at least two of said at least two segment arms.

6. The device as in claim 1, further comprising at least one latch tab which is configured to release at least one of said at least two segment arms.

7. The device as in claim 1, further comprising at least one segment arm extension.

8. The device as in claim 7, wherein said at least one segment arm extension comprises at least one first extension coupled to a first end of a first segment arm, and at least one second extension coupled to an opposite end of said first segment arm.

9. The device as in claim 7, wherein said at least one segment arm extension coupled to at least one of said at least two segment arms in a telescoping manner.

10. The device as in claim 1 wherein said recording device covering has a longitudinal axis, and a latitudinal axis and wherein the device further comprises at least one track that extends both along said longitudinal axis and said latitudinal axis.

11. The device as in claim 1, wherein said recording device covering has a longitudinal axis and wherein said at least one track extends along said longitudinal axis.

12. The device as in claim 1, further comprising at least one linkage, wherein said at least one linkage is coupled between at last one first segment arm, and at least one second segment arm.

13. The device as in claim 1, further comprising a handle coupled to said at least two segment arms and a radio signal transmitter disposed in said handle.

14. A device for extending and handling portable recording devices comprising:
    a recording device covering with at least one pivot point;
    at least two segment arms;
    at least one coupler connecting said at least two segment arms and
    wherein said at least two segment arms are configured for substantial extension beyond the perimeter of said recording device covering when the segment arms are rotated about said at least one coupler;
    at least one handle coupled to at least one of said arms.

15. The device as in claim 14, wherein said at least one handle is rotationally coupled to at least one of said arms.

16. A device for extending and handling portable recording devices comprising:
    a recording device covering with at least one pivot point;
    at least two segment arms;
    at least one coupler connecting said at least two segment arms and
    wherein said at least two segment arms are configured for substantial extension beyond the perimeter of said recording device covering when the segment arms are rotated about said at least one coupler;
    at least one linkage wherein said at least one linkage is rotationally coupled to said at least one first segment arm, and wherein said at least one second linkage is rotationally coupled to said at least one second segment arm, and wherein said at least one linkage is shorter than both said at least one first segment arm and said at least one second segment arm.

17. A device for extending and handling portable recording devices comprising:
    a recording device covering with at least one pivot point;
    at least two segment arms;
    at least one coupler connecting said at least two segment arms and
    wherein said at least two segment arms are configured for substantial extension beyond the perimeter of said recording device covering when the segment arms are rotated about said at least one coupler;
    at least one push rod coupled to at least one of said at least two segment arms, wherein said at least one push rod is configured to selectively lock at least two of said at least two segment arms from rotation relative to each other.

18. A device for extending and handling portable recording devices comprising:
    a recording device covering with at least one pivot point;
    at least two segment arms;
    at least one coupler connecting said at least two segment arms and
    wherein said at least two segment arms are configured for substantial extension beyond the perimeter of said recording device covering when the segment arms are rotated about said at least one coupler;
    at least one cover for selectively covering said at least two segment arms.

19. A device for extending and handling portable recording devices comprising:
    a recording device covering with at least one pivot point;
    at least two segment arms;
    at least one coupler connecting said at least two segment arms and wherein said at least two segment arms are configured for substantial extension beyond the perimeter of said recording device covering when the segment arms are rotated about said at least one coupler;
    at least one handle coupled to at least one of said at least two segment arms;
    at least one lock for locking the at least two segment arms in place, wherein said lock comprises at least one line which extends along said at least two segment arms wherein when said handle is rotated, it makes said line taught, thereby locking said at least two segment arms in place along an axis.

20. A device for extending a handle of a portable electronic device comprising:
    an electronic device covering with at least one pivot point;
    at least two segment arms;
    at least one coupler connecting said at least two segment arms and wherein said at least two segment arms are configured for substantial extension beyond the perimeter of said recording device covering when the segment arms are rotated about said at least one coupler;
    at least one lock for locking the at least two segment arms in place, wherein said lock comprises at least one shaft which extends along said at least two segment arms wherein when said at least two segment arms are extended, said shaft is moved along said at least two segment arms thereby locking said at least two segment arms in place along an axis.

21. The device as in claim 20, further comprising at least one spring coupled to said shaft, wherein said at least one spring is configured to drive said at least one shaft along said at least two segment arms to lock said at least two segment arms in place.

22. The device as in claim 20, wherein said at least two segment arms have at least one channel configured to house said at least one shaft, wherein said at least one shaft is slidable inside of said at least one channel.

23. The device as in claim 20, wherein said at least two segment arms extend along a substantially same plane.

24. A device for extending a handle of a portable electronic device comprising:
    an electronic device cover;
    at least two segment arms;
    at least one coupler connecting said at least two segment arms in a rotatable manner and wherein said at least two segment arms are configured for substantial extension beyond the perimeter of said recording device covering when the segment arms are rotated about said at least one coupler in a scissor like manner;
    at least one track coupled to said at least one cover;

a plurality of track pins, wherein at least two of said at least two segment arms are each coupled to said plurality of track pins, wherein said plurality of track pins are slidable along said at least one track to move said at least two segment arms from a retracted position to an extended position relative to said electronic device cover.

25. The device as in claim 24, wherein said at least one track has a narrowed section that tapers at one end.

26. The device as in claim 24, further comprising at least one additional track coupled to said cover, wherein said at least one track and said at least one additional track extend at least along a longitudinal axis of said cover.

27. The device as in claim 24, wherein said at least one track and said at least one additional track extend at least partially along both a longitudinal axis and at least one latitudinal axis of said cover.

* * * * *